United States Patent
Taylor

(10) Patent No.: US 12,158,986 B2
(45) Date of Patent: *Dec. 3, 2024

(54) VIRTUAL, AUGMENTED, AND MIXED REALITY SYSTEMS AND METHODS

(71) Applicant: MAGIC LEAP, INC., Plantation, FL (US)

(72) Inventor: Robert Blake Taylor, Porter Ranch, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,311

(22) Filed: Apr. 20, 2023

(65) Prior Publication Data

US 2023/0251710 A1 Aug. 10, 2023

Related U.S. Application Data

(63) Continuation of application No. 17/110,670, filed on Dec. 3, 2020, now Pat. No. 11,662,808.

(60) Provisional application No. 62/945,027, filed on Dec. 6, 2019.

(51) Int. Cl.
　　*G06F 3/01*　　　(2006.01)
　　*G06T 7/50*　　　(2017.01)
　　*G06T 19/00*　　　(2011.01)

(52) U.S. Cl.
　　CPC ............. *G06F 3/013* (2013.01); *G06T 7/50* (2017.01); *G06T 19/006* (2013.01)

(58) Field of Classification Search
　　CPC .......... G06F 3/013; G06T 7/50; G06T 19/006
　　See application file for complete search history.

(56) References Cited

U.S. PATENT DOCUMENTS

| | | | | |
|---|---|---|---|---|
| 9,292,973 | B2* | 3/2016 | Bar-Zeev | G02B 27/0149 |
| 2012/0113092 | A1* | 5/2012 | Bar-Zeev | G06T 19/006 |
| | | | | 345/419 |
| 2016/0026253 | A1* | 1/2016 | Bradski | H04N 13/128 |
| | | | | 345/8 |
| 2016/0260258 | A1* | 9/2016 | Lo | G02B 27/0172 |
| 2017/0148215 | A1 | 5/2017 | Aksoy et al. | |
| 2017/0160518 | A1* | 6/2017 | Lanman | G02B 27/0093 |
| 2017/0160798 | A1* | 6/2017 | Lanman | G06F 3/04842 |
| 2017/0237974 | A1* | 8/2017 | Samec | H04N 13/122 |
| | | | | 348/53 |

(Continued)

FOREIGN PATENT DOCUMENTS

JP　　　2014-219621　　　11/2014

OTHER PUBLICATIONS

Foreign Response for EP Patent Appln. No. 20897135.8 dated Jul. 21, 2023.

(Continued)

*Primary Examiner* — Yu Chen
(74) *Attorney, Agent, or Firm* — Vista IP Law Group, LLP

(57) ABSTRACT

A method for determining a focal point depth of a user of a three-dimensional ("3D") display device includes tracking a first gaze path of the user. The method also includes analyzing 3D data to identify one or more virtual objects along the first gaze path of the user. The method further includes when only one virtual object intersects the first gaze path of the user identifying a depth of the only one virtual object as the focal point depth of the user.

13 Claims, 17 Drawing Sheets

(56) References Cited

U.S. PATENT DOCUMENTS

| | | | | |
|---|---|---|---|---|
| 2018/0120573 A1* | 5/2018 | Ninan | ............ | G02C 7/08 |
| 2018/0275410 A1* | 9/2018 | Yeoh | ............ | G06T 19/006 |
| 2019/0172216 A1* | 6/2019 | Ninan | ............ | H04N 13/383 |
| 2020/0104589 A1* | 4/2020 | Sengelaub | ............ | G06T 7/50 |
| 2020/0319705 A1* | 10/2020 | Rohrbacher | ............ | G06F 3/04842 |
| 2021/0088790 A1* | 3/2021 | Forster | ............ | G02B 27/017 |
| 2021/0173474 A1* | 6/2021 | Sztuk | ............ | G06T 19/006 |

OTHER PUBLICATIONS

Foreign Response for JP Patent Appln. No. 2022-533463 dated May 13, 2024.
Foreign OA for JP Patent Appln. No. 2022-533463 dated Feb. 13, 2024.
Foreign OA for JP Patent Appln. No. 2022-533463 dated Jul. 23, 2024.
English Translation for Foreign OA for JP Patent Appln. No. 2022-533463 dated Jul. 23, 2024.
Foreign OA for CN Patent Appln. No. 202080084086.4 dated Sep. 6, 2024.
Foreign Response for JP Patent Appln. No. 2022-533463 dated Oct. 21, 2024.

* cited by examiner

VIRTUAL, AUGMENTED, AND MIXED REALITY SYSTEMS AND METHODS

CROSS-REFERENCE TO RELATED APPLICATIONS

The present disclosure is a continuation of pending U.S. patent application Ser. No. 17/110,670, filed on Dec. 3, 2020, and entitled "VIRTUAL, AUGMENTED, AND MIXED REALITY SYSTEMS AND METHODS", which claims priority to U.S. Provisional Patent Application Ser. No. 62/945,027, filed on Dec. 6, 2019, entitled "VIRTUAL, AUGMENTED, AND MIXED REALITY SYSTEMS AND METHODS". The present disclosure is related to U.S. Provisional Patent Application Ser. No. 62/945,024, filed on Dec. 6, 2019, entitled "VIRTUAL, AUGMENTED, AND MIXED REALITY SYSTEMS AND METHODS"; U.S. patent application Ser. No. 15/445,818, filed on Feb. 28, 2017, and entitled "DEPTH SENSING SYSTEMS AND METHODS"; U.S. Provisional Patent Application Ser. No. 62/851,773, filed on May 23, 2019, entitled "VIRTUAL, AUGMENTED, AND MIXED REALITY SYSTEMS AND METHODS"; U.S. patent application Ser. No. 14/555,585, filed on Nov. 27, 2014, entitled "VIRTUAL AND AUGMENTED REALITY SYSTEMS AND METHODS"; and U.S. patent application Ser. No. 14/738,877, filed on Jun. 13, 2015, entitled "METHODS AND SYSTEMS FOR CREATING VIRTUAL AND AUGMENTED REALITY". The contents of the aforementioned U.S. patents, U.S. patent applications, and U.S. provisional patent applications are hereby explicitly and fully incorporated by reference in their entireties for all purposes, as though set forth in the present disclosure in full.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE DISCLOSURE

The present disclosure relates to virtual reality, augmented reality, and mixed reality imaging, visualization, and display systems and methods. In particular, the present disclosure relates to virtual reality, augmented reality, and mixed reality imaging, visualization, and display systems and methods for determining a depth of a viewer's point of focus.

BACKGROUND

Modern computing and display technologies have facilitated the development of virtual reality (VR), augmented reality (AR), and mixed reality (MR) systems. VR systems create a simulated environment for a user to experience. This can be done by presenting computer-generated imagery to the user through a head-mounted display. This imagery creates a sensory experience which immerses the user in the simulated environment. A VR scenario typically involves presentation of only computer-generated imagery rather than also including actual real-world imagery.

AR systems generally supplement a real-world environment with simulated elements. For example, AR systems may provide a user with a view of the surrounding real-world environment via a head-mounted display. However, computer-generated imagery can also be presented on the display to enhance the real-world environment. This computer-generated imagery can include elements which are contextually-related to the real-world environment. Such elements can include simulated text, images, objects, etc. MR systems also introduce simulated objects into a real-world environment, but these objects typically feature a greater degree of interactivity than in AR systems. The simulated elements can often times be interactive in real time.

FIG. 1 depicts an example AR/MR scene 2 where a user sees a real-world park setting 6 featuring people, trees, buildings in the background, and a concrete platform 20. In addition to these items, computer-generated imagery is also presented to the user. The computer-generated imagery can include, for example, a robot statue 10 standing upon the real-world platform 20, and a cartoon-like avatar character 12 flying by which seems to be a personification of a bumble bee, even though these elements 12, 10 are not actually present in the real-world environment.

Various optical systems generate images at various depths for displaying VR, AR, or MR scenarios. Some such optical systems are described in U.S. Utility patent application Ser. No. 14/555,585 filed on Nov. 27, 2014, the contents of which have been previously incorporated by reference herein. Other such optical systems for displaying MR experiences are described in U.S. Utility patent application Ser. No. 14/738,877, the contents of which have been previously incorporated by reference herein.

VR/AR/MR systems can operate in a variety of display modes, including blended light field and discrete light field modes. In a blended light field mode ("blended mode") a display presents a synthetic light field including images simultaneously or nearly simultaneously displayed at two or more discrete depth planes. In a discrete light field mode ("discrete mode") a display presents a synthetic light field including an image displayed at a single depth plane. The illuminated depth plane is controllable in discrete mode. Some VR/AR/MR systems include eye-tracking subsystems for determining a viewer's point of focus. Such systems can illuminate the depth plane corresponding to the viewer's point of focus.

Because the human visual perception system is complex, it is challenging to produce a VR/AR/MR technology that facilitates a comfortable, natural-feeling, rich presentation of virtual image elements amongst other virtual or real-world imagery elements. Three-dimensional ("3D") image display systems experience the vergence-accommodation conflict problem. This problem occurs when two optical depth related biological processes send conflicting depth signals to a user/viewer's brain. Vergence relates to the tendency of the viewer's eye(s) to rotate to align the optical axis (axes) with an object of the viewer's attention at a distance. In binocular systems, the point at which the optical axes intersect can be called a "point of vergence." The amount of rotation of the viewer's eye(s) during vergence is interpreted by the viewer's brain as an estimated depth. Accommodation relates to the tendency of the lens(es) of the viewer's eye(s) to focus so that an object of the viewer's attention at a distance. The focus of the viewer's eye(s) during vergence is interpreted by the viewer's brain as another estimated depth. When the vergence and accommodation signals are interpreted by the viewer's brain as the same or similar estimated depths, the 3D viewing experience is natural and comfortable for the viewer. On the other hand, when the vergence and accommodation signals are interpreted by the viewer's brain as the substantially different estimated depths, the 3D viewing experience is suboptimal for the viewer, and may result in discomfort (eyestrain, headaches, etc.) and fatigue. Such problems are known as vergence-accommodation conflict.

Portable VR/AR/MR systems also have other limitations such as size and portability issues, battery life issues, system overheating issues, processing power, memory, bandwidth, data sources, component latency, and other system and optical challenges, which can negatively impact VR/AR/MR system performance. These other limitations must be taken into consideration when implementing 3D image rendering techniques for natural vergence and accommodation. In order to accommodate these hardware related limitations of VR/AR/MR systems, it is often useful to determine a user/viewer's point of focus. While some systems map the user/viewer's point of focus to the user/viewer's point of vergence, limitations in eye tracking hardware and rapid user/viewer eye movement reduce the accuracy of determination of a user/viewer's point of focus using this method. Determining a user/viewer's point of focus allows VR/AR/MR systems to effectively apportion limited hardware resources. In particular, determining the depth of a user/viewer's point of focus allows VR/AR/MR systems to direct limited hardware resources to a particular plane that coincides with the user/viewer's point of focus.

One method of determining the depth of a user/viewer's point of focus is to generate a depth map of an entire field of view using depth sensing, then use eye tracking to identify the depth of the user/viewer's point of focus using the depth map of the field of view. Depth sensing is the determination of the distance between a known point in three-dimensional ("3D") space (e.g., a sensor) and a point of interest ("POI") on a surface of an object. Depth sensing is also known as texture sensing because determining the respective distances of a plurality of POIs on a surface determines the texture of that surface. Depth or texture sensing is useful for many computer vision systems, including mixed reality systems. Further details depth sensing is described in U.S. Utility patent application Ser. No. 15/445,818, the contents of which have been previously Incorporated by reference herein. Generating a depth map can be a demanding process in terms of hardware (e.g., infrared cameras and infrared light projectors) and processing power. With a moving VR/AR/MR system depth map would need to be continuously updated at a cost in terms of processing power, memory, communications channels, etc.

Improved systems and techniques are needed for processing image data and displaying images, including, for example, systems and techniques for determining a depth of a user/viewer's point of focus for rendering and displaying 3D images to viewers/users while minimizing vergence-accommodation conflict, and systems and techniques for minimizing demands on limited graphical processing capabilities of portable VR/AR/MR systems while doing so. Improved systems and techniques are needed for addressing these issues. The systems and methods described herein are configured to address these and other challenges.

What is needed is a technique or techniques to improve over legacy techniques and/or over other considered approaches. Some of the approaches described in this background section are approaches that could be pursued, but not necessarily approaches that have been previously conceived or pursued.

SUMMARY

In one embodiment, a method for determining a focal point depth of a user of a three-dimensional ("3D") display device includes tracking a first gaze path of the user. The method also includes analyzing 3D data to identify one or more virtual objects along the first gaze path of the user. The method further includes when only one virtual object intersects the first gaze path of the user identifying a depth of the only one virtual object as the focal point depth of the user.

In one or more embodiments, each of the one or more virtual objects is displayed at a respective depth from the user. Analyzing the plurality of 3D data may include analyzing depth segmentation data corresponding to 3D data. The method may also include performing a vergence analysis on the user to generate a vergence focal point depth of the user, and using the vergence focal point depth of the user to improve an accuracy of the focal point depth of the user.

In one or more embodiments, when more than one virtual object intersects the first gaze path of the user, the method may also include tracking a second gaze path of the user. The method may also include analyzing the 3D data to identify one or more virtual objects along the second gaze path of the user. The method may further include when only one virtual object intersects both the first gaze path and the second gaze path of the user identifying a depth of the only one 2D image frame as the focal point depth of the user.

In another embodiment, a method for determining a focal point depth of a user of a three-dimensional ("3D") display device includes tracking a first gaze path of the user. The method also includes analyzing a plurality of Two-dimensional ("2D") image frames displayed by the display device to identify one or more virtual objects along the first gaze path of the user. The method further includes, when only one 2D image frame of the plurality includes a virtual object along the first gaze path of the user, identifying a depth of the only one 2D image frame as the focal point depth of the user.

In one or more embodiments, each of the plurality of 2D image frames are displayed at respective depths from the user. Analyzing the plurality of 2D image frames may include analyzing depth segmentation data corresponding to the plurality of 2D image frames. The method may also include performing a vergence analysis on the user to generate a vergence focal point depth of the user; and using the vergence focal point depth of the user to improve an accuracy of the focal point depth of the user.

In one or more embodiments, when more than one 2D image frame of the plurality includes a virtual object along the first gaze path of the user, the method may also include tracking a second gaze path of the user. The method may also include analyzing the plurality of 2D image frames displayed by the display device to identify one or more virtual objects along the second gaze path of the user. The method may further include when only one 2D image frame of the plurality includes a virtual object along both the first gaze path and the second gaze path of the user identifying a depth of the only one 2D image frame as the focal point depth of the user.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawings described below are for illustration purposes only. The drawings are not intended to limit the scope of the present disclosure. This patent or application file contains at least one drawing executed in color. Copies of this patent or patent application publication with color drawings will be provided by the U.S. Patent and Trademark Office upon request and payment of the necessary fee.

Figure 1:
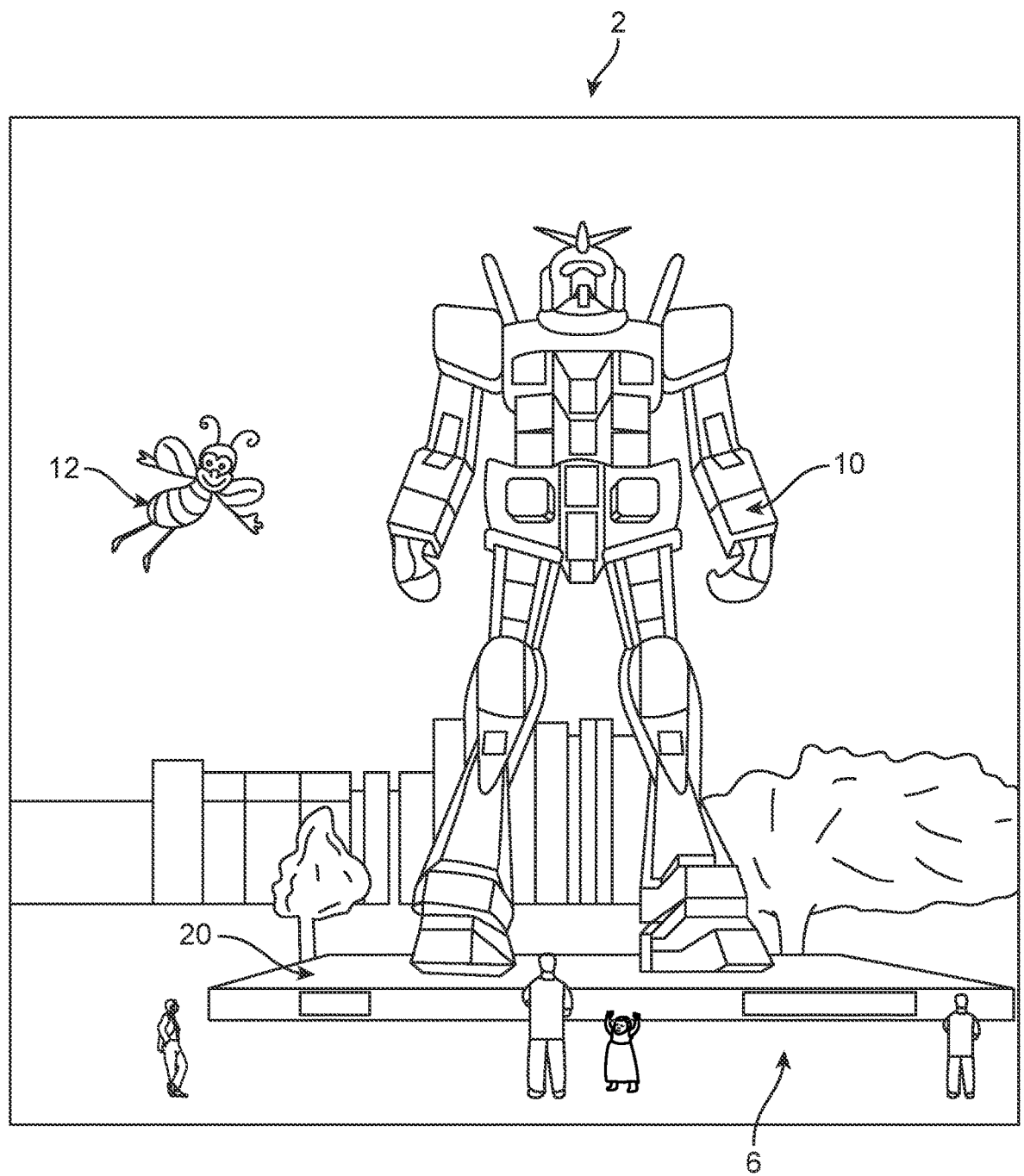
Figure 2:
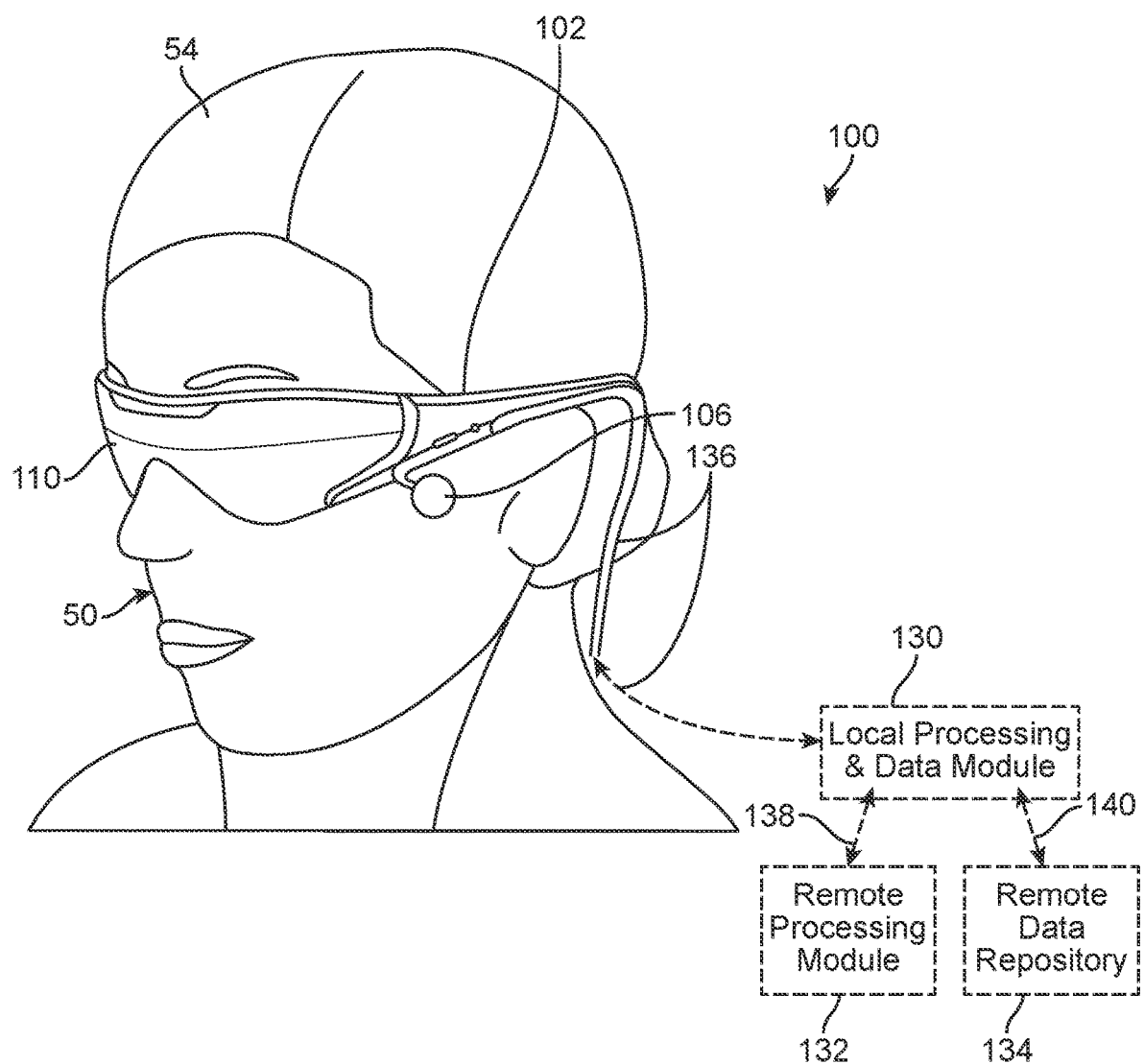
Figure 3:
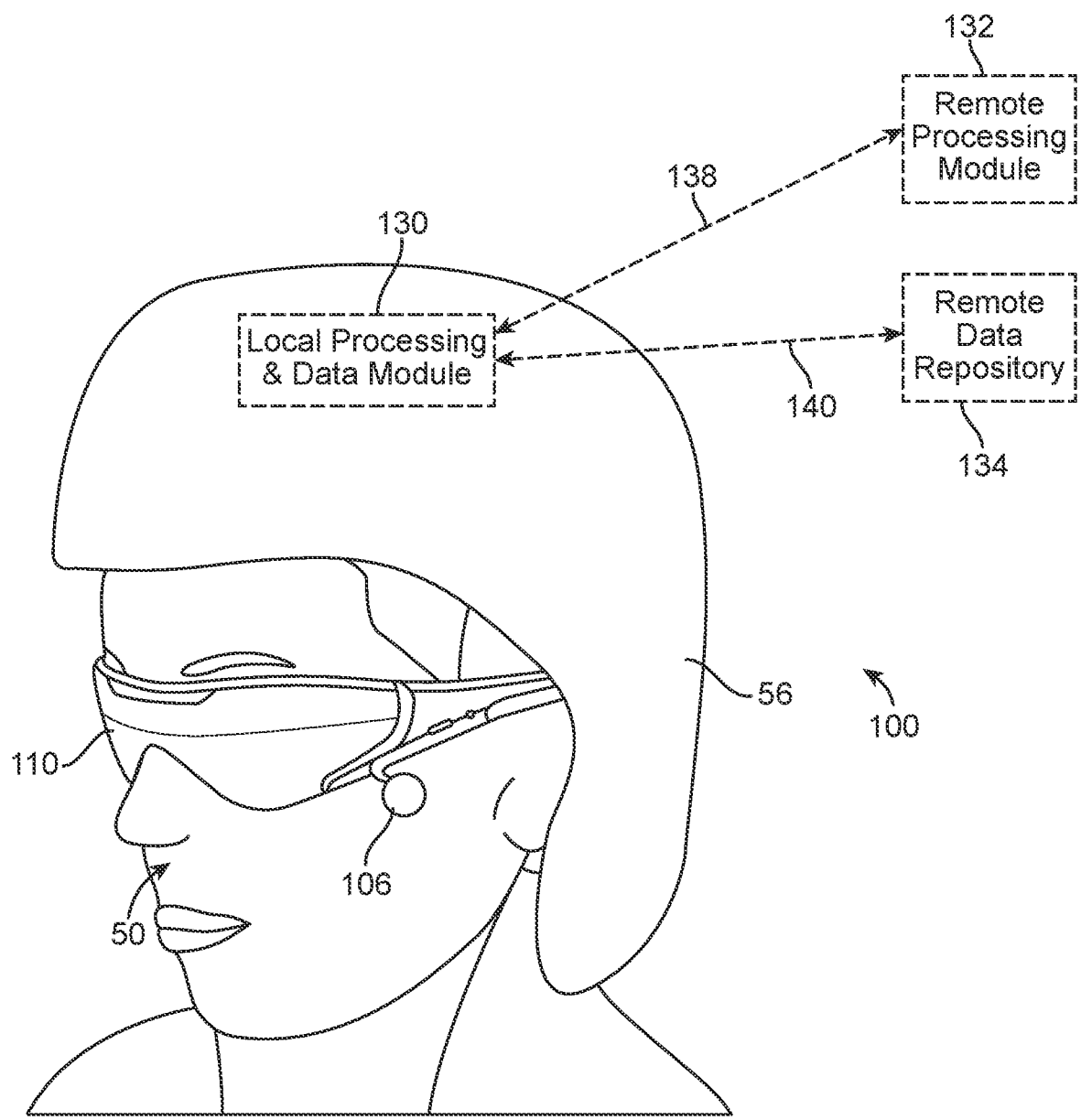
Figure 4:
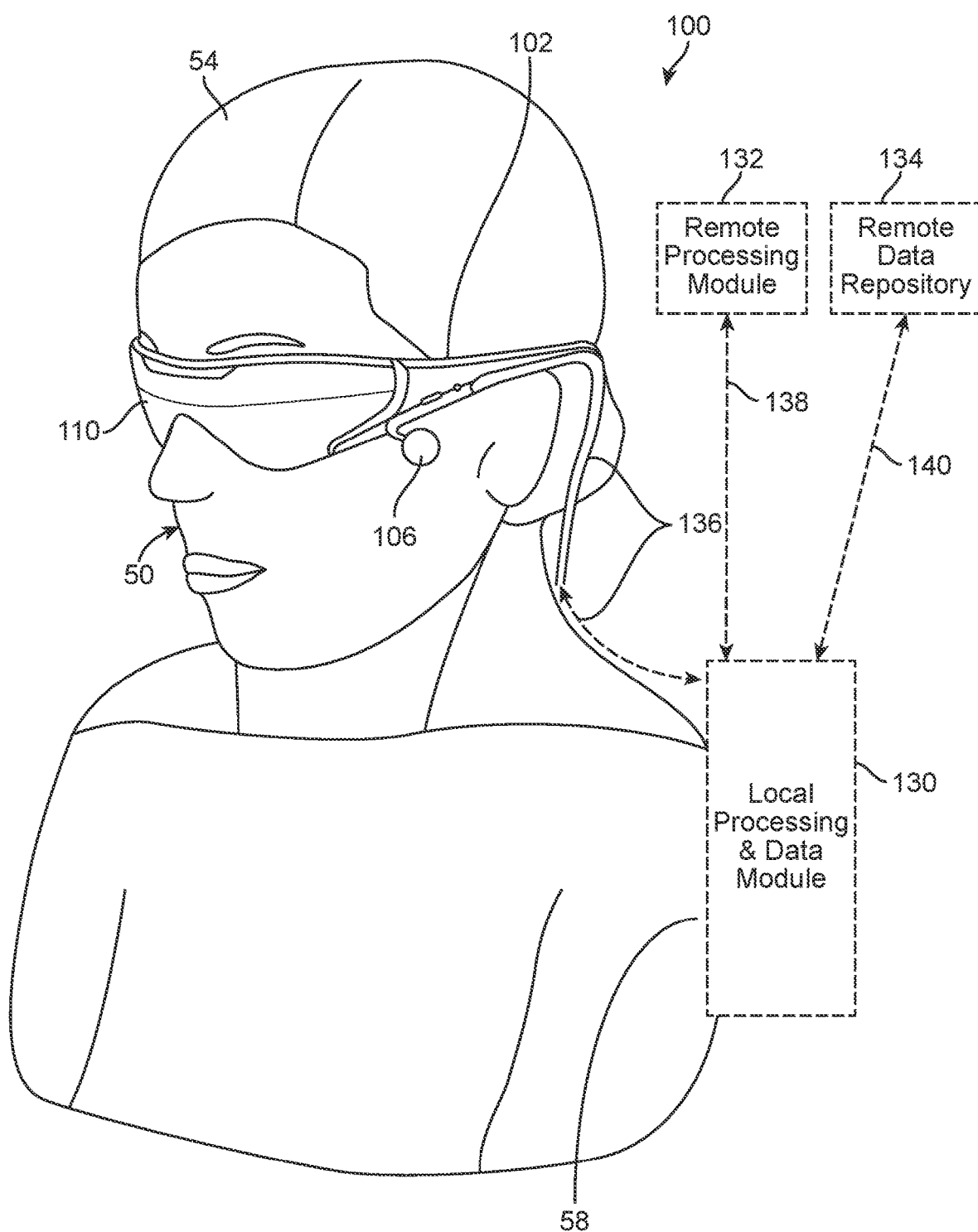

The drawings illustrate the design and utility of various embodiments of the present disclosure. It should be noted that the figures are not drawn to scale and that elements of similar structures or functions are represented by like reference numerals throughout the figures. In order to better appreciate how to obtain the recited and other advantages and objects of various embodiments of the disclosure, a more detailed description of the present disclosure will be rendered by reference to specific embodiments thereof, which are illustrated in the accompanying drawings.

Understanding that these drawings depict only typical embodiments of the disclosure and are not therefore to be considered limiting of its scope, the disclosure will be described and explained with additional specificity and detail through the use of the accompanying drawings.

FIG. 1 illustrates a user's view of an AR/MR scene using an example AR system.

FIGS. 2-5 schematically depict users using VR/AR/MR systems according to some embodiments.

Figure 6:
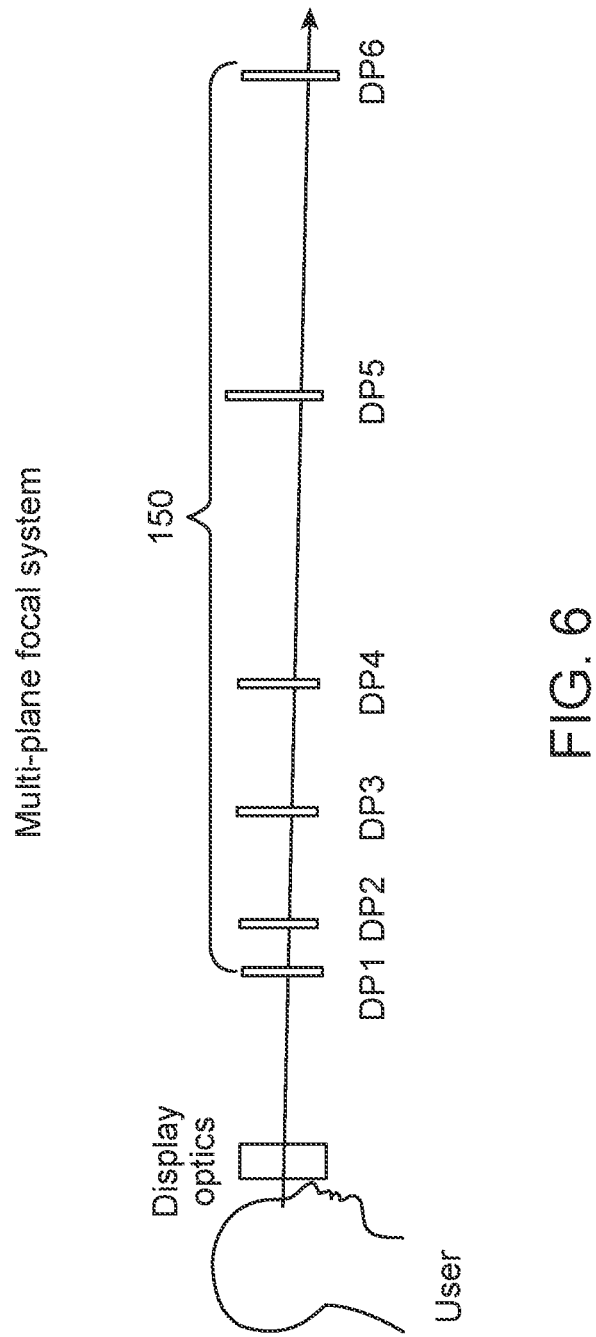

FIG. 6 schematically depicts various planes of a multi-plane focal system according to some embodiments.

Figure 7:
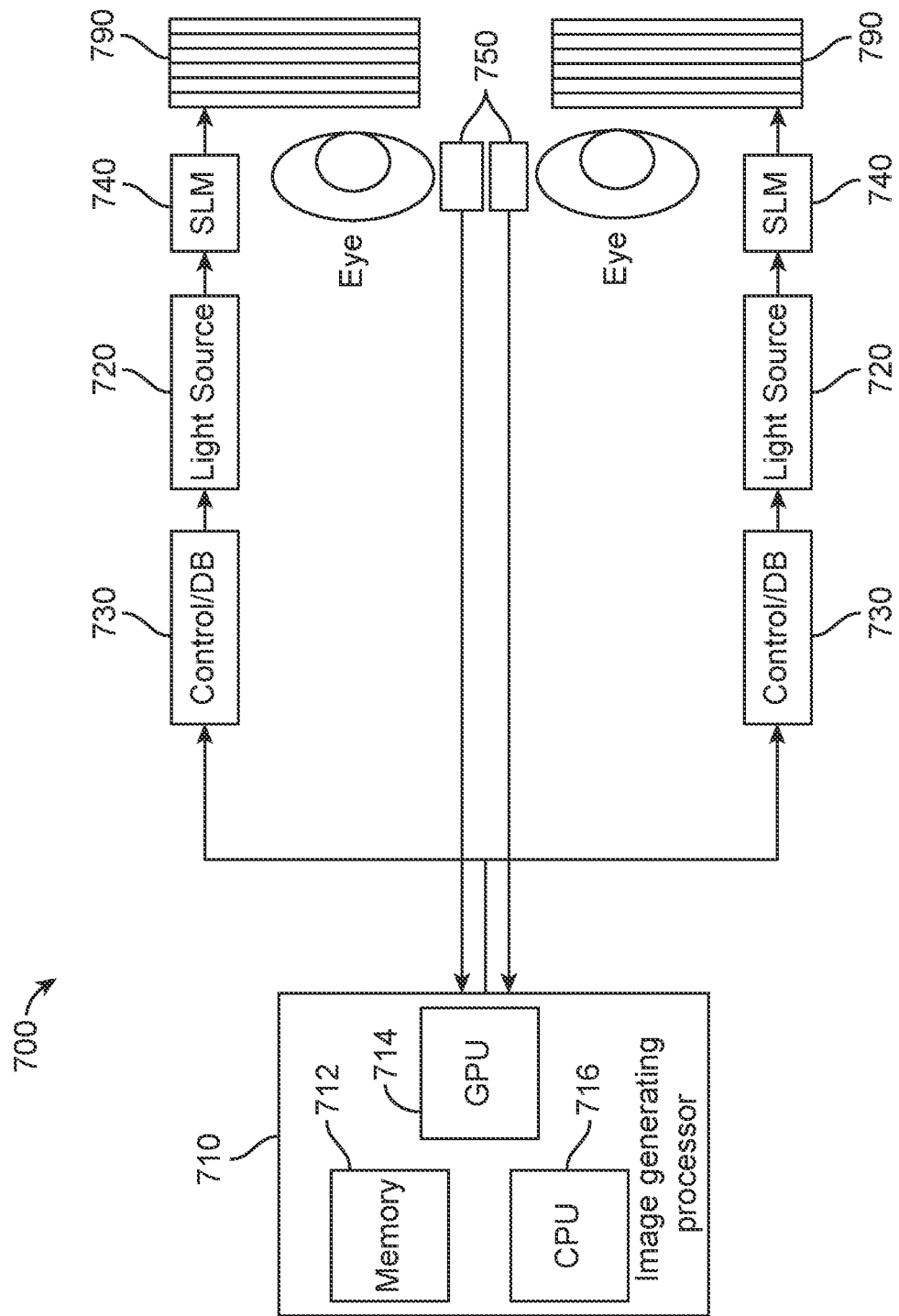

FIG. 7 schematically depicts a VR/AR/MR system according to some embodiments.

Figure 8A:
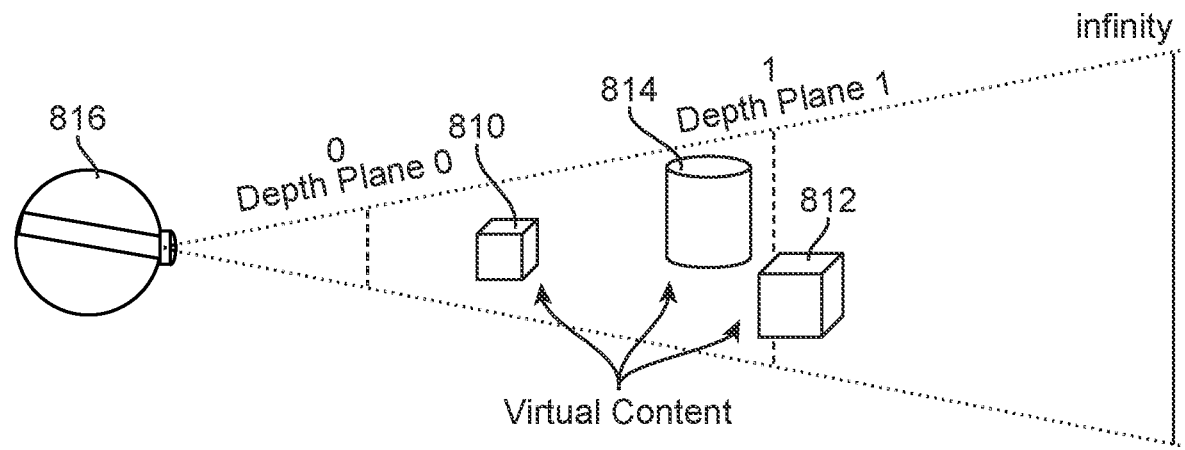
Figure 8B:
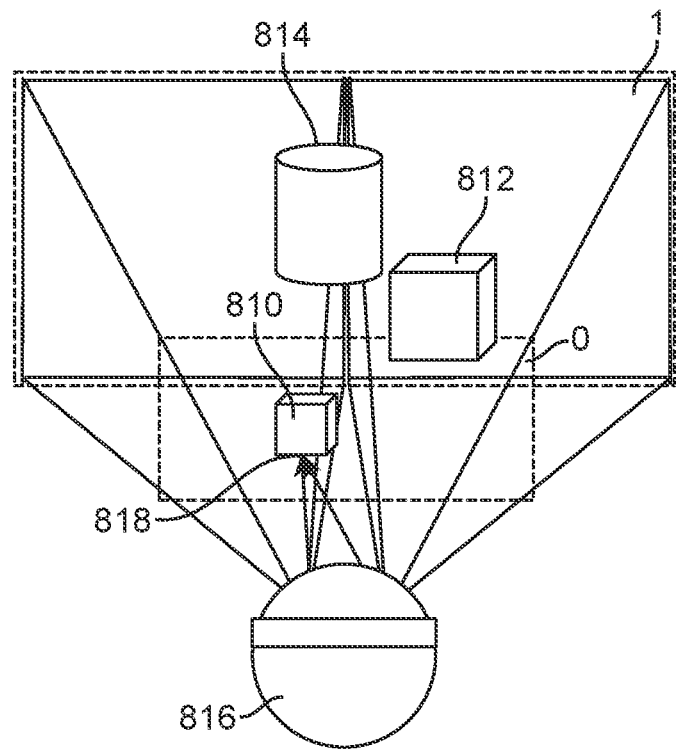

FIGS. 8A and 8B schematically depict a 3D image including a plurality of virtual objects from a side perspective view (FIG. 8A) and a rear perspective view (FIG. 8B) according to some embodiments.

Figure 9A:
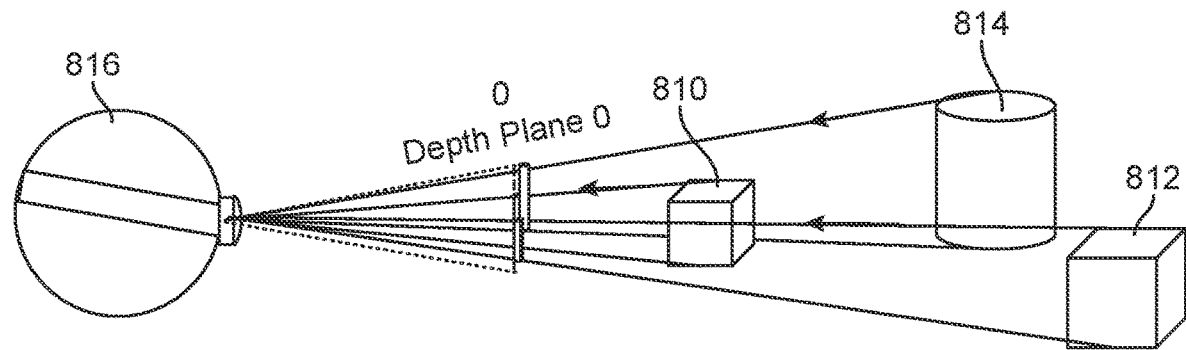
Figure 9B:
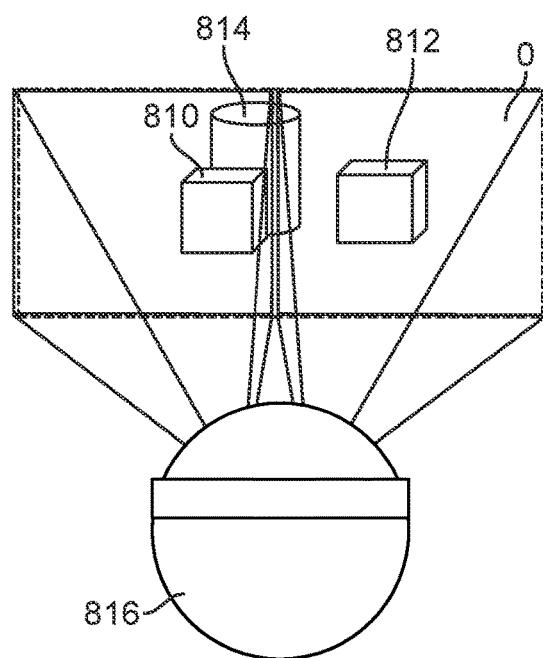

FIGS. 9A and 9B schematically depict a 3D image including a plurality of virtual objects projected onto a single depth plane for display in a discrete mode from a side perspective view (FIG. 9A) and a rear perspective view (FIG. 9B).

Figure 10A:
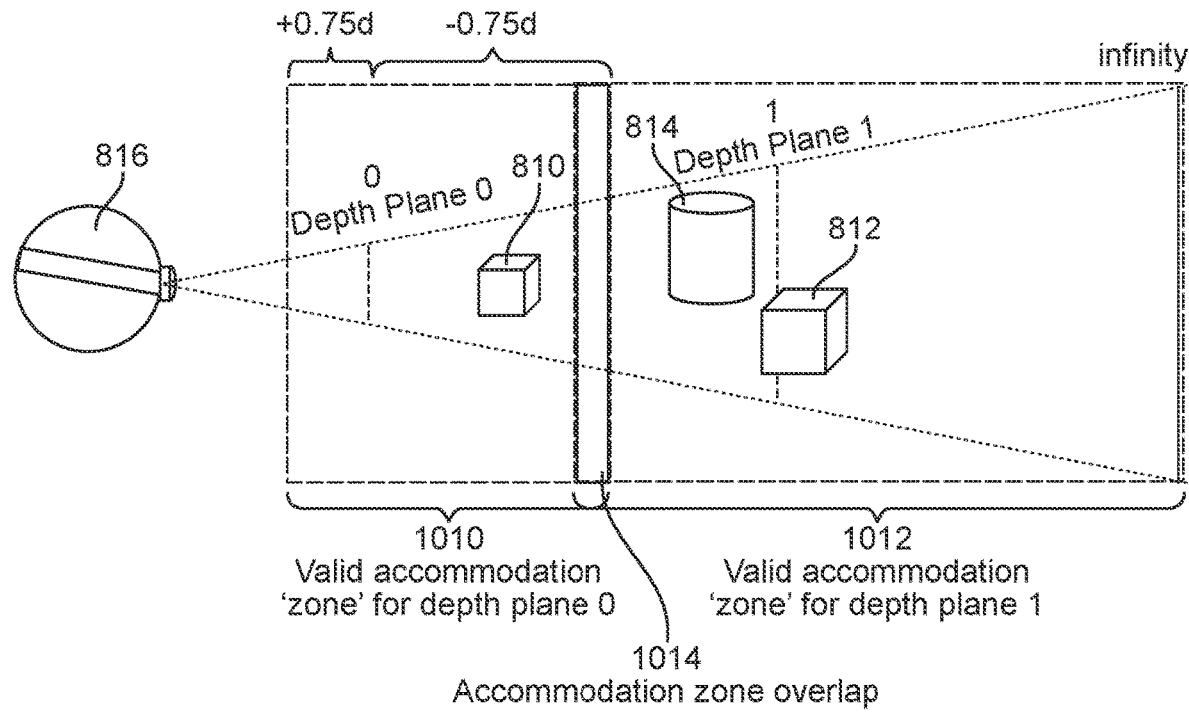

FIG. 10A schematically depicts near and far accommodation zones and an accommodation overlap zone of a dual plane blended mode display system according to some embodiments.

Figure 10B:
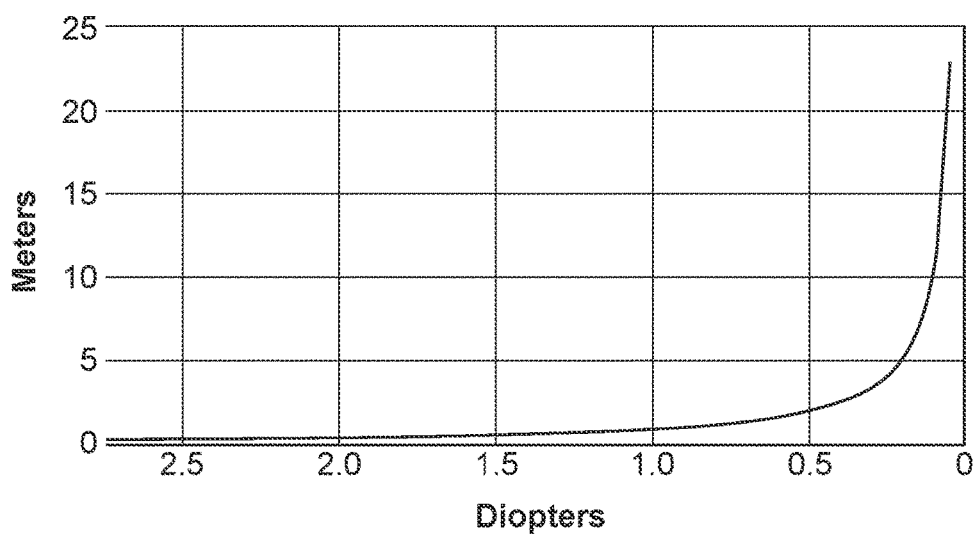

FIG. 10B schematically depicts the relationship between distance from a viewer and diopters.

Figure 11:
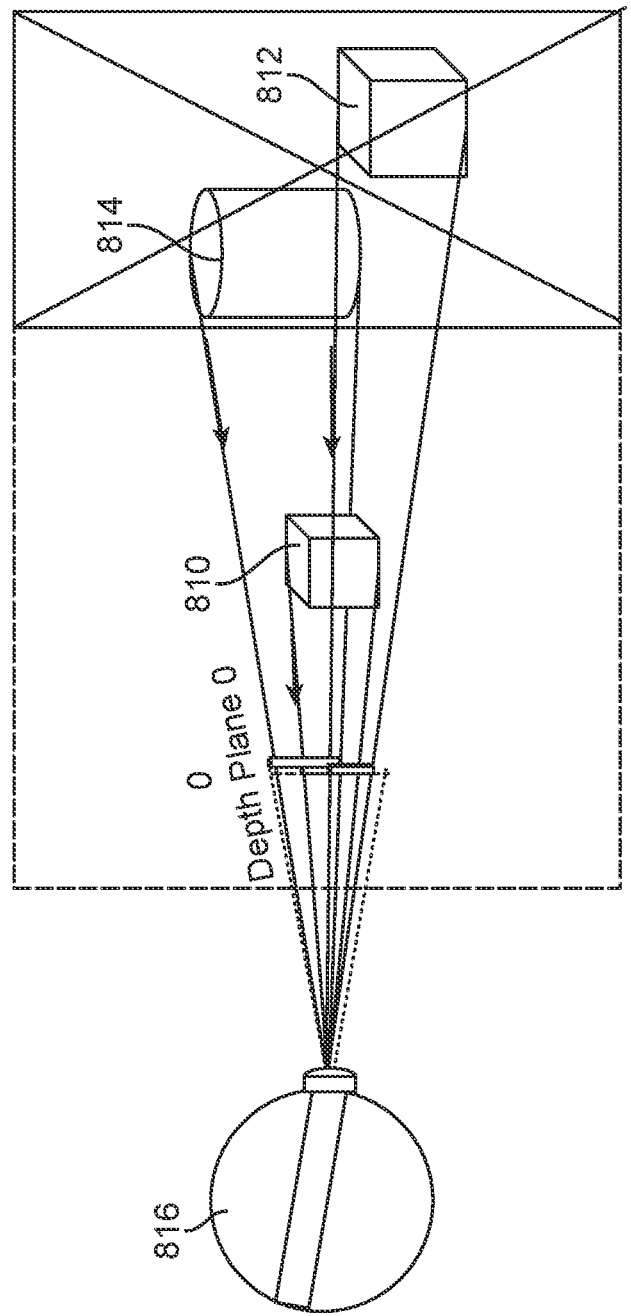

FIG. 11 schematically depicts a 3D image including a plurality of virtual objects projected onto a single depth plane for display in a discrete mode from a side perspective view.

Figure 12A:
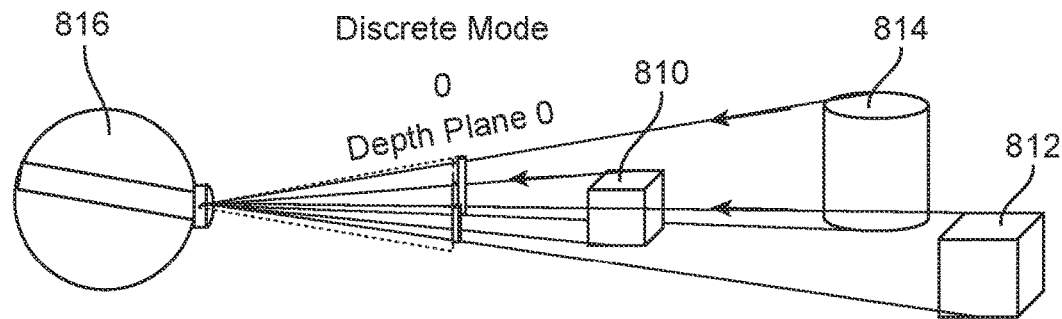

FIG. 12A schematically depicts a 3D image including a plurality of virtual objects projected onto a single depth plane for display in a discrete mode from a side perspective view.

Figure 12B:
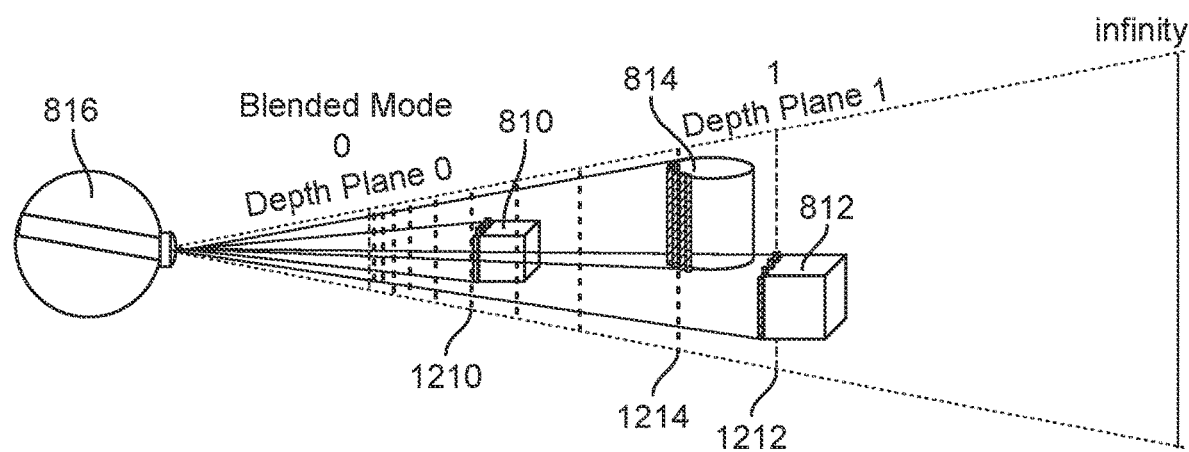

FIG. 12B schematically depicts a 3D image including a plurality of virtual objects with a plurality of virtual depth planes to be displayed in a blended mode from a side perspective view.

Figure 13:
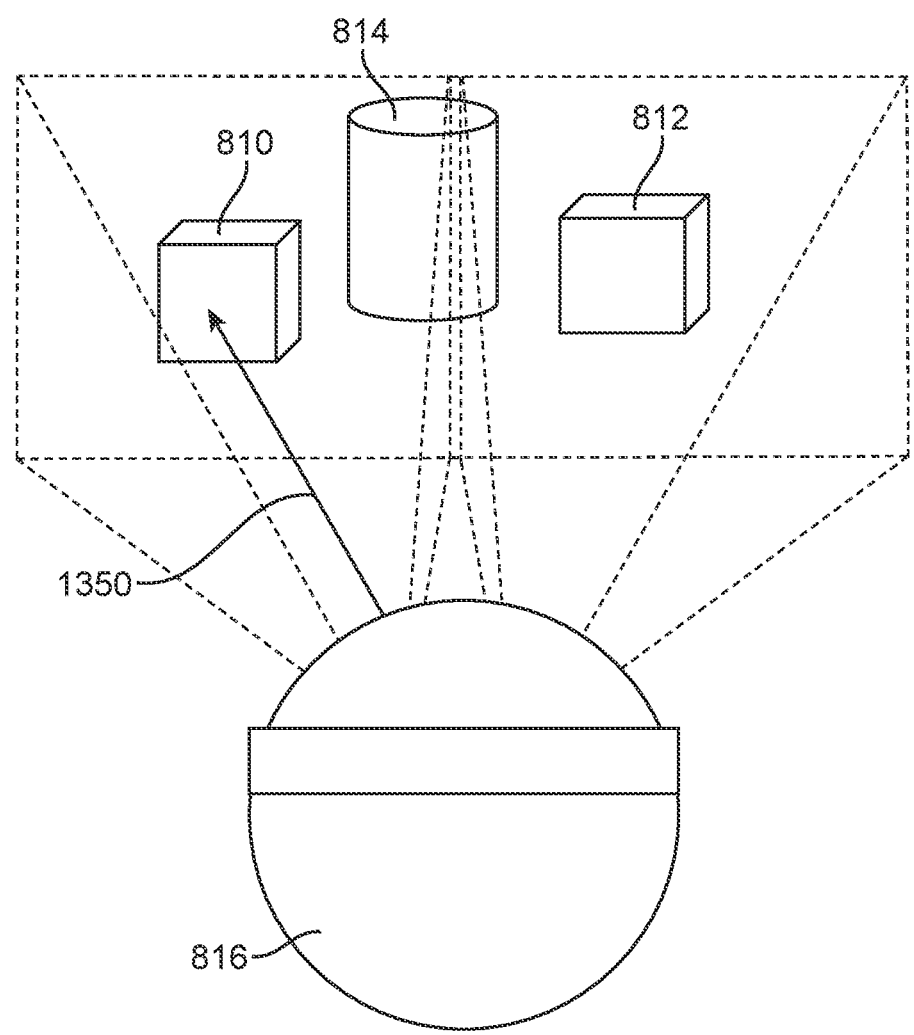
Figure 14:
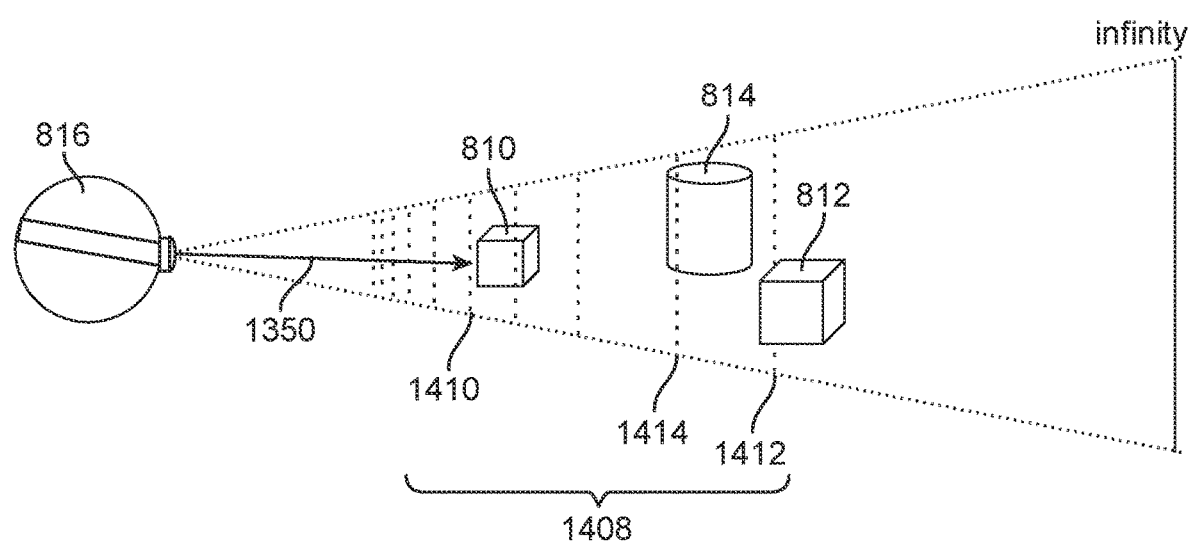

FIGS. 13 and 14 schematically depicts a system and a method for determining a user/viewer's focal plane from a rear perspective view (FIG. 13) and side perspective view (FIG. 14) according to some embodiments.

Figure 15:
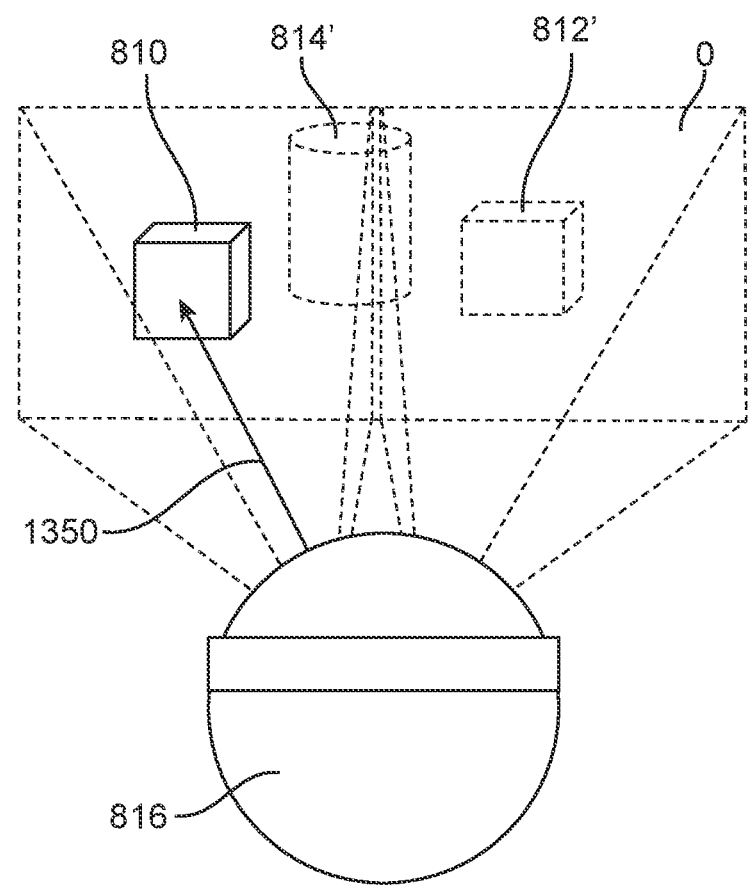

FIG. 15 schematically depicts a 3D image including a plurality of virtual objects blurred and projected onto a single determined depth plane for display in a discrete mode from a rear perspective view according to some embodiments.

Figure 16:
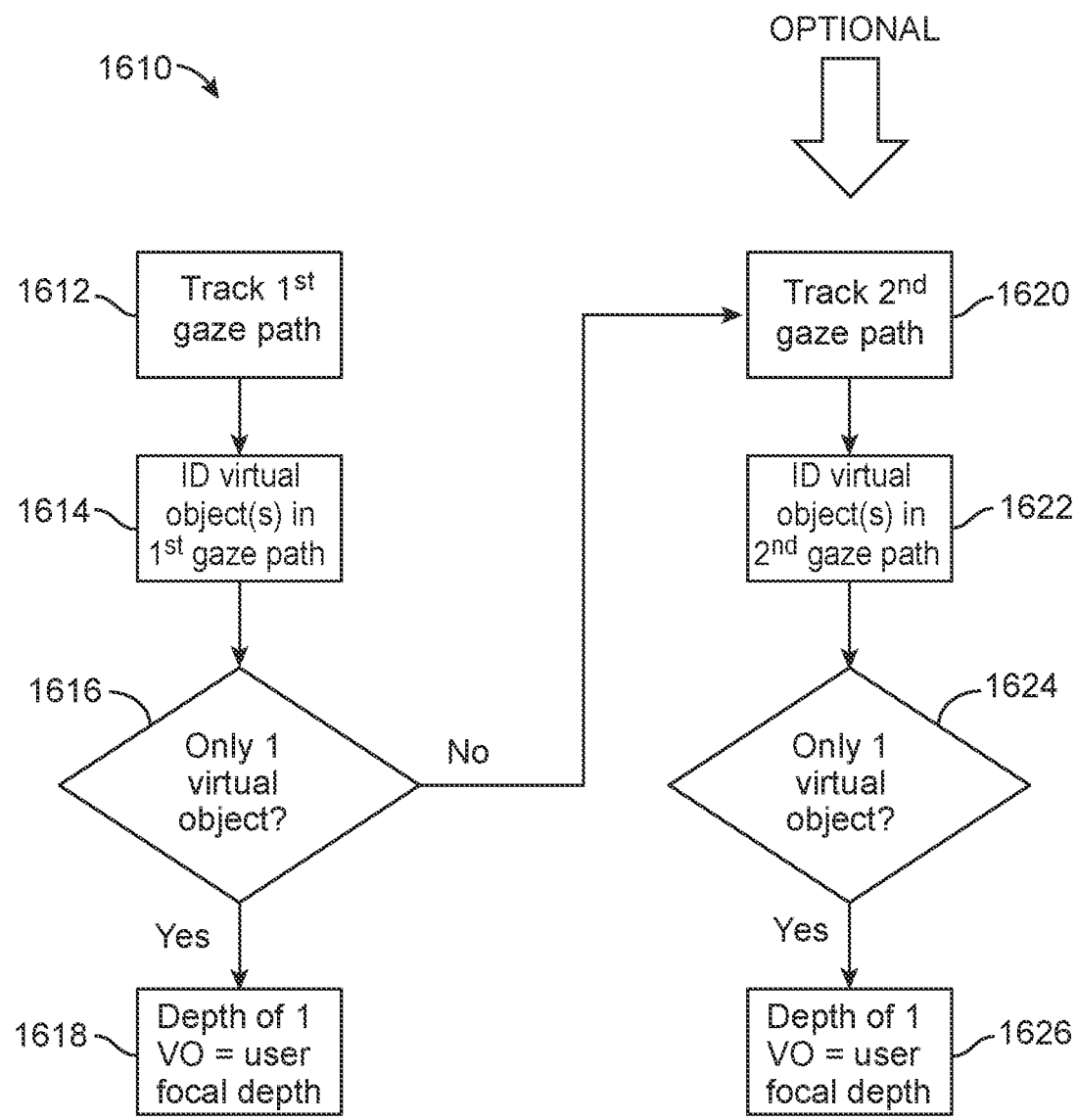

FIG. 16 is a flow chart illustrating a method for determining a user/viewer's focal plane according to some embodiments.

Figure 17:
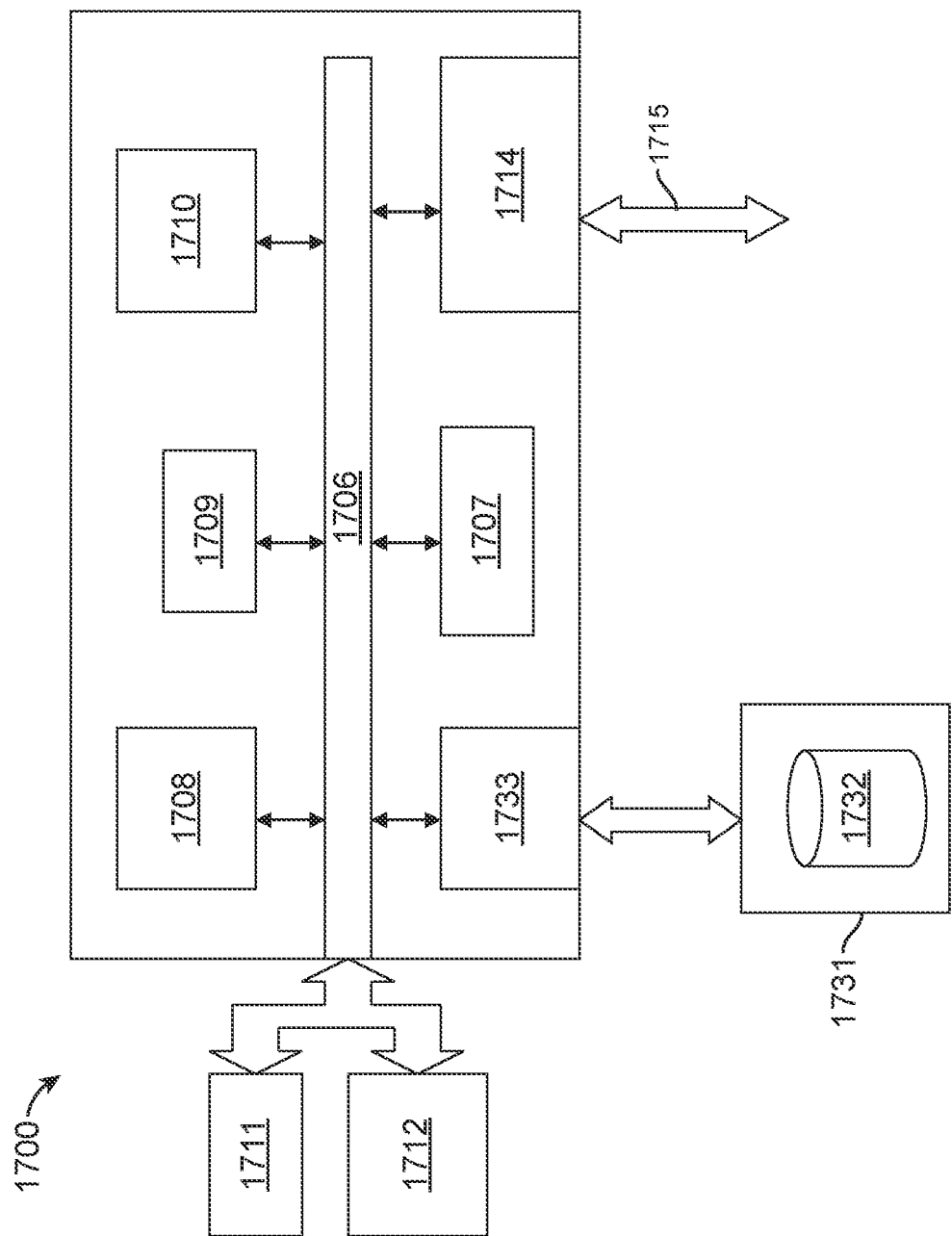

FIG. 17 is a block diagram schematically depicting an illustrative computing system according to some embodiments.

DETAILED DESCRIPTION

Various embodiments of the disclosure are directed to systems, methods, and articles of manufacture for virtual reality (VR)/augmented reality (AR)/mixed reality (MR) in a single embodiment or in multiple embodiments. Other objects, features, and advantages of the disclosure are described in the detailed description, figures, and claims.

Various embodiments will now be described in detail with reference to the drawings, which are provided as illustrative examples so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Embodiments in accordance with the present disclosure address the problem of implementation of VR/AR/MR systems often rely on combinations of off-the-shelf-components and custom components. In some cases, the off-the-shelf components do not possess all of the features or performance characteristics that are needed to implement certain desired aspects of the to-be-deployed VR/AR/MR system. Some embodiments are directed to approaches for adding capabilities and/or repurposing resources to accommodate the desired features or performance characteristics of the to-be-deployed VR/AR/MR system. The accompanying figures and discussions herein present example environments, systems, methods, and computer program products for VR/AR/MR systems.

The head mounted audio-visual display system and 3D image rendering system may be implemented independently of AR/MR systems, but some embodiments below are described in relation to AR/MR systems for illustrative purposes only. The 3D image rendering and display systems described herein may also be used in a similar manner with VR systems.

Summary of Problems and Solutions

As described above, VR/AR/MR systems have limitations such as size and portability, battery life, system overheating, processing power, memory, bandwidth, data sources, component latency, and other system and optical challenges, which can negatively impact VR/AR/MR system performance. These limitations may result in reducing graphical processing and image display demands becoming a countervailing challenge to improving 3D image rendering and display. VR/AR/MR systems can more effectively deploy limited processing and display resources by identifying a depth plane corresponding to a user/viewer's point of focus. However, using only vergence to identify the user/viewer's focal plane may not be sufficiently accurate. On the other hand, generating a depth map for use in identifying the user/viewer's focal plane may add to the processing and hardware demands on VR/AR/MR systems.

For instance, due to potential graphical processing and size/portability issues, VR/AR/MR systems, especially head worn systems, may only include sufficient components to be able to render and display color images at one depth plane per frame at a minimal frame rate (e.g., 60 Hz) for smooth display of moving virtual objects (i.e., discrete mode). An example of such a VR/AR/MR system operating in discrete mode is shown in FIGS. 8A to 9B. As schematically shown in FIG. 8A, the 3D image includes three virtual objects (near and far cubes 810, 812 and one cylinder 814) adjacent various depth planes (near cube 810 adjacent near depth plane 0 and far cube 812 and cylinder 814 adjacent far depth plane 1). In some embodiments, the near depth plane 0 is at about 1.96 diopters and the far depth plane 1 is at about 0.67 diopters. FIG. 8B is a viewer's perspective view of the 3D image shown in FIG. 8A. In FIG. 8B, tracking the eyes of the user/viewer 816 indicates that the eyes of the viewer verge to a point of vergence 818 coinciding with the location of the near cube 810. In discrete mode, only a single depth plane is illuminated (i.e., image rendered and displayed) per frame. As schematically shown in FIG. 9A, because the point of vergence 818 coincides with the location of the near cube 810, which is adjacent near depth plane 0, all the content of the 3D image (i.e., near and far cubes 810, 812 and cylinder 814) are projected onto near depth plane 0. FIG. 9B is a viewer's perspective view of the 3D image after its content has been projected onto near depth plane 0. Only near depth plane 0 is illuminated, and the eyes of the viewer 816 accommodate to near depth plane 0. As described above, equating a user/viewer's point of focus with the user/viewer's point of vergence can result in less accurate determination of this important data point.

In some embodiments, projecting all of the content of the 3D image onto a single depth plane only triggers minimal vergence-accommodation conflict (e.g., minimal user discomfort, eyestrain, headaches). This is because there is a loose coupling of accommodation and vergence such that the human brain will tolerate up to about a 0.75 diopter mismatch between accommodation and vergence. As shown in FIG. 10A, this ±0.75 diopter tolerance translates to a near accommodation zone 1010 and a far accommodation zone 1012. Because of the inverse relationship between distance and diopters, as shown in FIG. 10B, the far accommodation zone 1012 is larger than the nearer accommodation zone 1010. With the near depth plane 0 and the far depth plane 1 in the embodiment depicted in FIG. 10A, the ±0.75 diopter tolerance also results in an accommodation zone overlap 1014 where object depths falling in the accommodation zone overlap 1014 may be displayed at either or both the near depth plane 0 and the far depth plane 1, for example, at different scales, with different brightness and/or color values, etc. In embodiments where all of the content of the 3D image are located in either near the accommodation zone 1010 or the far accommodation zone 1012 and the eyes of the viewer 816 verge to that depth plane, projecting all of the content of the 3-D image onto that depth plane only triggers minimal vergence-accommodation conflict.

Operating in discrete mode allows a VR/AR/MR system to deliver a 3D image while functioning within its hardware limitations (e.g., processing, display, memory, communications channels, etc.) However, discrete mode display requires accurate identification the single depth plane to be illuminated, while minimizing demands on system resources. A VR/AR/MR system operating in blended mode can also reduce demands on system resources by concentrating those resources on the depth plane corresponding to a user/viewer's point of focus. Again, this resource conserving method for blended mode displays requires accurate identification of the user/viewer's focal plane.

The embodiments described herein include 3D image rendering and display systems and methods for use with various VR/AR/MR systems. These 3D image rendering and display systems and methods identify a depth plane corresponding to a user/viewer's point of focus for use in both discrete mode and blended mode displays while reducing the system resources consumed, thereby addressing many of the above described issues.

Illustrative VR, AR, and/or MR Systems

The description that follows pertains to illustrative VR, AR, and/or MR systems with which embodiments of various 3D image rendering and display systems may be practiced. However, it is to be understood that the embodiments also lend themselves to applications in other types of display systems (including other types of VR, AR, and/or MR systems), and therefore the embodiments are not to be limited to only the illustrative systems disclosed herein.

VR/AR/MR systems disclosed herein can include a display which presents computer-generated imagery (video/image data) to a user. In some embodiments, the display systems are wearable, which may advantageously provide a more immersive VR/AR/MR experience. Various components of VR, AR, and/or MR virtual image systems 100 are depicted in FIGS. 2 to 5. The virtual image generation system 100 includes a frame structure 102 worn by an end user 50, a display subsystem 110 carried by the frame structure 102, such that the display subsystem 110 is positioned in front of the eyes of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 110 is designed to present the eyes of the end user 50 with light patterns that can be comfortably perceived as augmentations to physical reality, with high-levels of image quality and three-dimensional perception, as well as being capable of presenting two-dimensional content. The display subsystem 110 presents a sequence of frames at high frequency that provides the perception of a single coherent scene.

In the illustrated embodiments, the display subsystem 110 employs "optical see-through" display through which the user can directly view light from real objects via transparent (or semi-transparent) elements. The transparent element, often referred to as a "combiner," superimposes light from the display over the user's view of the real world. To this end, the display subsystem 110 includes a partially transparent display. In some embodiments, the transparent display may be electronically controlled. In some embodiments, the transparent display may include segmented dimming to control transparency of one or more portions of the transparent display. In some embodiments, the transparent display may include global dimming to control transparency of the entirety of the transparent display. The display is positioned in the end user's 50 field of view between the eyes of the end user 50 and an ambient environment, such that direct light from the ambient environment is transmitted through the display to the eyes of the end user 50.

In the illustrated embodiments, an image projection assembly provides light to the partially transparent display, thereby combining with the direct light from the ambient environment, and being transmitted from the display to the eyes of the user 50. The projection subsystem may be an optical fiber scan-based projection device, and the display may be a waveguide-based display into which the scanned light from the projection subsystem is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual system (i.e., one layer is within the cone of confusion of an adjacent layer). Additionally, or alternatively, picture elements (i.e., sub-images) may be blended across two or more layers to increase perceived continuity of transition between layers in the light field, even if those layers are more sparsely stacked (i.e., one layer is outside the cone of confusion of an adjacent layer). The display subsystem 110 may be monocular or binocular. While the image projection system may be capable of generating a blended mode, system limitations (e.g., power, heat, speed, etc.) may limit the image projection system to a discrete mode with a single viewing distance per frame.

The virtual image generation system 100 may also include one or more sensors (not shown) mounted to the frame structure 102 for detecting the position and movement of the head 54 of the end user 50 and/or the eye position and inter-ocular distance of the end user 50. Such sensors may include image capture devices (such as cameras), microphones, inertial measurement units, accelerometers, compasses, GPS units, radio devices, and/or gyros). Many of these sensors operate on the assumption that the frame 102 on which they are affixed is in turn substantially fixed to the user's head, eyes, and ears. The virtual image generation system 100 may also include one or more user facing cameras to track a user's eyes.

The virtual image generation system 100 may also include a user orientation detection module. The user orientation module detects the instantaneous position of the head 54 of the end user 50 (e.g., via sensors coupled to the frame 102) and may predict the position of the head 54 of the end user 50 based on position data received from the sensors. Detecting the instantaneous position of the head 54 of the end user 50 facilitates determination of the specific actual object that the end user 50 is looking at, thereby providing an indication of the specific virtual object to be generated in relation to that actual object and further providing an indication of the position in which the virtual object is to be displayed. The user orientation module may also track the eyes of the end user 50 based on the tracking data received from the sensors.

The virtual image generation system 100 may also include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), display bridge chips, display controllers, programmable gate arrays (PGAs), for instance field PGAs (FPGAs), and/or programmable logic controllers (PLUs).

The control subsystem of virtual image generation system 100 may include a central processing unit (CPU), a graphics processing unit (GPU), one or more frame buffers, and a three-dimensional database for storing three-dimensional scene data. The CPU may control overall operation, while the GPU may render frames (i.e., translating a three-dimensional scene into a two-dimensional image) from the three-dimensional data stored in the three-dimensional database and store these frames in the frame buffers. One or more additional integrated circuits may control the reading into and/or reading out of frames from the frame buffers and operation of the image projection assembly of the display subsystem 110.

Figure 5:
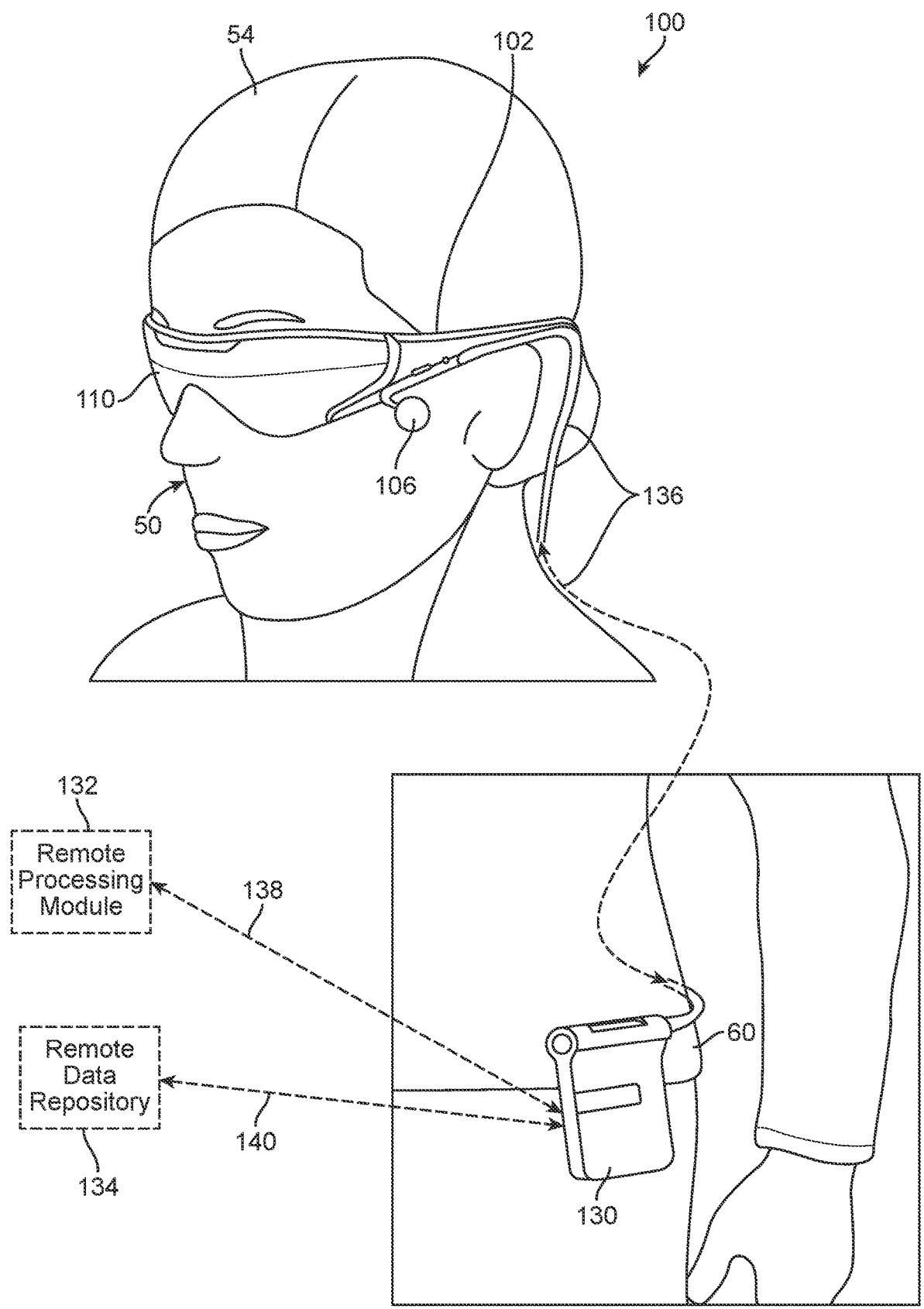

The various processing components of the virtual image generation system 100 may be physically contained in a distributed subsystem. For example, as illustrated in FIGS. 2 to 5, the virtual image generation system 100 may include a local processing and data module 130 operatively coupled, such as by a wired lead or wireless connectivity 136, to a local display bridge 142, the display subsystem 110, and sensors. The local processing and data module 130 may be mounted in a variety of configurations, such as fixedly attached to the frame structure 102 (FIG. 2), fixedly attached to a helmet or hat 56 (FIG. 3), removably attached to the torso 58 of the end user 50 (FIG. 4), or removably attached to the hip 60 of the end user 50 in a belt-coupling style configuration (FIG. 5). The virtual image generation system 100 may also include a remote processing module 132 and remote data repository 134 operatively coupled, such as by a wired lead or wireless connectivity 138, 140, to the local processing and data module 130 and the local display bridge 142, such that these remote modules 132, 134 are operatively coupled to each other and available as resources to the local processing and data module 130 and the local display bridge 142.

The local processing and data module 130 and the local display bridge 142 may each include a power-efficient processor or controller, as well as digital memory, such as flash memory, both of which may be utilized to assist in the processing, caching, and storage of data captured from the sensors and/or acquired and/or processed using the remote processing module 132 and/or remote data repository 134, possibly for passage to the display subsystem 110 after such processing or retrieval. The remote processing module 132 may include one or more relatively powerful processors or controllers configured to analyze and process data and/or image information. The remote data repository 134 may include a relatively large-scale digital data storage facility, which may be available through the internet or other networking configuration in a "cloud" resource configuration. In some embodiments, all data is stored and all computation is performed in the local processing and data module 130 and the local display bridge 142, allowing fully autonomous use from any remote modules.

The couplings 136, 138, 140 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 2 to 5. Thus, the particular choice of wired or wireless communications should not be considered limiting.

In some embodiments, the user orientation module is contained in the local processing and data module 130 and/or the local display bridge 142, while CPU and GPU are contained in the remote processing module. In alternative embodiments, the CPU, GPU, or portions thereof may be contained in the local processing and data module 130 and/or the local display bridge 142. The 3D database can be associated with the remote data repository 134 or disposed locally.

Some VR, AR, and/or MR systems use a plurality of volume phase holograms, surface-relief holograms, or light guiding optical elements that are embedded with depth plane information to generate images that appear to originate from respective depth planes. In other words, a diffraction pattern, or diffractive optical element (DOE) may be embedded within or imprinted/embossed upon a light guiding optical element (LOE; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3D virtual content to the user, the VR, AR, and/or MR system projects images of the virtual content into the user's eye so that they appear to originate from various depth planes in the Z direction (i.e., orthogonally away from the user's eye) in either a blended or a discrete mode. In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may simultaneously see a virtual bird at a distance of 3 meters away from the user and a virtual coffee cup at arm's length (about 1 meter) from the user. Alternatively, the user may see a virtual dragon appear from infinity and run towards the user.

Multiple-plane focus systems create a perception of variable depth by projecting images on some or all of a plurality of depth planes located at respective fixed distances in the Z direction from the user's eye in either a blended or discrete mode. Referring now to FIG. 6, it should be appreciated that multiple-plane focus systems may display frames at fixed depth planes 150 (e.g., the six depth planes 150 shown in FIG. 6). Although MR systems can include any number of depth planes 150, one exemplary multiple-plane focus system has six fixed depth planes 150 in the Z direction. In generating virtual content one or more of the six depth planes 150, 3D perception is created such that the user perceives one or more virtual objects at varying distances from the user's eye. Given that the human eye is more sensitive to objects that are closer in distance than objects that appear to be far away, more depth planes 150 are generated closer to the eye, as shown in FIG. 6. In other embodiments, the depth planes 150 may be placed at equal distances away from each other.

Depth plane positions 150 may be measured in diopters, which is a unit of optical power equal to the inverse of the focal length measured in meters. For example, in some embodiments, depth plane DP1 may be ⅓ diopters away, depth plane DP2 may be 0.3 diopters away, depth plane DP3 may be 0.2 diopters away, depth plane DP4 may be 0.15 diopters away, depth plane DP5 may be 0.1 diopters away, and depth plane DP6 may represent infinity (i.e., 0 diopters away). It should be appreciated that other embodiments may generate depth planes 150 at other distances/diopters. Thus, in generating virtual content at strategically placed depth planes 150, the user is able to perceive virtual objects in three dimensions. For example, the user may perceive a first virtual object as being close to him when displayed in depth plane DP1, while another virtual object appears at infinity at depth plane DP6. Alternatively, the virtual object may first be displayed at depth plane DP6, then depth plane DP5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3D view of the coffee cup.

In some embodiments, the VR, AR, and/or MR system may work as a multiple-plane focus system. In other words, all six LOEs may be illuminated almost simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE retaining collimation of light (e.g., depth plane DP6 from FIG. 6) may be utilized. Then an image of a closer tree branch may be injected at time 2 and an LOE configured to create an image appearing to originate from a depth plane 10 meters away (e.g., depth plane DP5 from FIG. 6) may be utilized; then an image of a pen may be injected at time 3 and an LOE configured to create an image appearing to originate from a depth plane 1 meter away may be utilized. This type of paradigm can be repeated in rapid time sequential fashion such that the user's eye and brain (e.g., visual cortex) perceives the input to be all part of the same image.

In blended mode, such multiple plane focus systems have system requirements in terms of display and processor speed, which may not be achievable in portable VR, AR, and/or MR systems. In order to overcome these system limitations, blended mode systems may display images adjacent a user/viewer's focal depth more clearly while displaying other images less clearly at a lower cost in terms of display and processor speed. In discrete mode, such multiple plane focus systems may project all 3D image content, regardless of optical depth to a single depth plane corresponding to the user/viewer's point of focus. However, all discrete mode display systems require identification of the user/viewer's focal depth.

VR, AR, and/or MR systems may project images (i.e., by diverging or converging light beams) that appear to originate from various locations along the Z axis (i.e., depth planes) to generate images for a 3D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

Referring now to FIG. 7, an exemplary embodiment of an AR or MR system 700 (hereinafter referred to as "system 700") is illustrated. The system 700 uses stacked light guiding optical element (hereinafter referred to as "LOEs 790"). The system 700 generally includes one or more image generating processors 710, one or more light sources 720, one or more controller/display bridges (DB) 730, one or more spatial light modulators (SLM) 740, and one or more sets of stacked LOEs 790 that function as a multiple plane focus system. The system 700 may also include an eye-tracking subsystem 750.

The image generating processor 710 is configured to generate virtual content to be displayed to the user. The image generating processor 710 may convert an image or video associated with the virtual content to a format that can be projected to the user in 3D. For example, in generating 3D content, the virtual content may need to be formatted such that portions of a particular image are displayed at a particular depth plane while others are displayed at other depth planes. In one embodiment, all of the image may be generated at a particular depth plane. In another embodiment, the image generating processor 710 may be programmed to provide slightly different images to the right and left eyes such that when viewed together, the virtual content appears coherent and comfortable to the user's eyes.

The image generating processor 710 may further include a memory 712, a GPU 714, a CPU 716, and other circuitry for image generation and processing. The image generating processor 710 may be programmed with the desired virtual content to be presented to the user of the system 700. It should be appreciated that in some embodiments, the image generating processor 710 may be housed in the system 700. In other embodiments, the image generating processor 710 and other circuitry may be housed in a belt pack that is coupled to the system 700. In some embodiments, the image generating processor 710, or one or more components thereof, may be a part of a local processing and data module (e.g., local processing and data module 130). As mentioned above, the local processing and data module 130 may be mounted in a variety of configurations, such as fixedly attached to the frame structure 102 (FIG. 2), fixedly attached to a helmet or hat 56 (FIG. 3), removably attached to the torso 58 of the end user 50 (FIG. 4), or removably attached to the hip 60 of the end user 50 in a belt-coupling style configuration (FIG. 5).

The image generating processor 710 is operatively coupled to the light source 720 which projects light associated with the desired virtual content and one or more spatial light modulators 740. The light source 720 is compact and has high resolution. The light source 720 is operatively coupled to a controller/DB 730. The light source 720 may be include color specific LEDs and lasers disposed in various geometric configurations. Alternatively, the light source 720 may include LEDs or lasers of like color, each one linked to a specific region of the field of view of the display. In another embodiment, the light source 720 may include a broad-area emitter such as an incandescent or fluorescent lamp with a mask overlay for segmentation of emission areas and positions. Although the light source 720 is directly connected to the system 700 in FIG. 2B, the light source 720 may be connected to the system 700 via optical fibers (not shown). The system 700 may also include condenser (not shown) configured to collimate the light from the light source 720.

The SLM 740 may be reflective (e.g., an LCOS, an FLCOS, a DLP DMD, or a MEMS mirror system), transmissive (e.g., an LCD) or emissive (e.g., an FSD or an OLED) in various exemplary embodiments. The type of SLM 740 (e.g., speed, size, etc.) can be selected to improve the creation of the 3D perception. While DLP DMDs operating at higher refresh rates may be easily incorporated into stationary systems 700, wearable systems 700 may use DLPs of smaller size and power. The power of the DLP changes how 3D depth planes/focal planes are created. The image generating processor 710 is operatively coupled to the SLM 740, which encodes the light from the light source 720 with the desired virtual content. Light from the light source 720 may be encoded with the image information when it reflects off of, emits from, or passes through the SLM 740.

Light from the SLM 740 is directed to the LOEs 790 such that light beams encoded with image data for one depth plane and/or color by the SLM 740 are effectively propagated along a single LOE 790 for delivery to an eye of a user. Each LOE 790 is configured to project an image or sub-image that appears to originate from a desired depth plane or FOV angular position onto a user's retina. The light source 720 and LOEs 790 can therefore selectively project images (synchronously encoded by the SLM 740 under the control of controller/DB 730) that appear to originate from various depth planes or positions in space. By sequentially projecting images using each of the light source 720 and LOEs 790 at a sufficiently high frame rate (e.g., 360 Hz for six depth planes at an effective full-volume frame rate of 60 Hz), the system 700 can generate a 3D image of virtual objects at various depth planes that appear to exist simultaneously in the 3D image.

The controller/DB 730 is in communication with and operatively coupled to the image generating processor 710, the light source 720 and the SLM 740 to coordinate the synchronous display of images by instructing the SLM 740 to encode the light beams from the light source 720 with appropriate image information from the image generating processor 710. While the system includes an image generating processor 710, the controller/DB 730, in some embodiments, may also perform at least some image generating processes including, for example, the processes of the memory 712, the GPU 714, and/or the CPU 716. In some embodiments, the controller/DB 730 may include one or more components shown in the image generating processor 710, such as, for example, the memory 712, the GPU 714, and/or the CPU 716.

The system 700 may also include an eye-tracking subsystem 750 that is configured to track the user's eyes to determine the user's point of vergence and a direction for each of the user's eyes. The eye-tracking subsystem 750 may also be configured to identify a depth plane corresponding to a user/viewer's point of focus in order to more efficiently generate images and/or display images in discrete mode (e.g., using the user's point of vergence and/or the direction of each of the user's eyes). In one embodiment, the system 700 is configured to illuminate a subset of LOEs 790 in discrete mode, based on input from the eye-tracking subsystem 750 such that the image is generated at a desired depth plane that coincides with the user's point of focus as shown in FIGS. 9A and 9B. For example, if the user's point of focus is at infinity (e.g., user's eyes are parallel to each other, and other factors described below), the system 700 may illuminate the LOE 790 that is configured to deliver collimated light to the user's eyes, such that the image appears to originate from optical infinity. In another example, if the eye-tracking subsystem 750 determines that the user's point of focus is at 1 meter away, the LOE 790 that is configured to focus approximately within that range may be illuminated instead. In embodiments where depth planes approximating the entire depth range are simultaneously (or almost simultaneously) illuminated in blended mode, the eye-tracking subsystem 750 may still enable more efficient image rendering by identifying user's point of focus.

Illustrative User/Viewer Focal Depth Determination System and Method

FIG. 12A depicts a discrete mode display where the near and far cubes 810, 812 and the cylinder 814 are projected onto the near depth plane 0 in response to tracking the point of focus of the viewer 816 to the near cube 810, which is adjacent the near depth plane 0. Projection to the near depth plane 0 results in viewer accommodation to the near depth plane 0 even for the far cube 812 and the cylinder 814, which are closer to the far depth plane 1 than the near depth plane 0. In order to operate in a discrete mode, the system must identify or obtain the depth plane corresponding to the viewer's 816 point of focus ("focal plane").

FIGS. 13 and 14 depict a system and FIG. 16 depicts a method for determining a viewer's 816 focal plane. At step 1612 (see FIG. 16), the display system (e.g., an eye-tracking subsystem thereof) tracks a gaze path 1350 of the viewer 816 (see FIGS. 13 and 14). The display system may use an eye-tracking subsystem (described above) to track the gaze path 1350. In some embodiments, the display system tracks one or more gaze paths. For example, the display system may track a gaze path for only a left eye, only a right eye, or both eyes of the viewer 816. At step 1614 the display system analyzes the 3D image data to identify one or more virtual objects along the gaze path of the viewer 816. Analyzing the 3D image data to identify one or more virtual objects along the gaze path of the viewer 816 may include analyzing depth segmentation data corresponding to the 3D data. If there is only one virtual object that intersects the gaze path of the viewer 816 as determined at step 1616, the display system identifies a depth of the intersecting virtual object at a point of intersection as the depth of the focal plane of the viewer 816 at step 1618.

In particular, FIGS. 13 and 14 show that the gaze path 1350 of the viewer 816 intersects only the near cube 810. FIG. 14 shows that the near cube 810 has a depth of 1410, the far cube 812 has a depth of 1412, and the cylinder 814 has a depth of 1414. FIG. 14 also shows that the system is capable of projecting images at one or more depths 1408. Because the system has determined that the near cube 810 is the only virtual object that intersects the gaze path 1305 of the viewer 816, the system identifies the depth 1410 of the near cube 810 as the depth of the focal plane of the viewer 816. While not necessary, this system and method for determining a viewer's 816 focal plane is more accurate when virtual objects 810, 812, 814 are already being displayed to the viewer 816. In such an embodiment, the gaze path 1350 of the viewer 816 indicates that the viewer 816 is likely focused on a particular virtual object (e.g., near cube 810).

In embodiments where the gaze path of the viewer intersects more than one virtual object (i.e., "no" at step 1616), the display system may proceed along an optional method at steps 1620 to 1626. At step 1620, the display system tracks a second gaze path of the viewer. In some embodiments, the first gaze path is associated with a first eye of the user and the second gaze path is associated with a second eye of the user. At step 1622, the display system analyzes the 3D image data to identify one or more virtual objects along the second gaze path of the viewer. If there is only one virtual object that intersects both the gaze path and the second gaze path of the viewer as determined at step 1624, the display system identifies a depth of the intersecting virtual object as the depth of the focal plane of the viewer at step 1626.

In some embodiments, the display system may use the eye-tracking subsystem to determine a point of vergence of the viewer's eyes. Then the display system may use the determined point of vergence to confirm its identification of the depth of the focal plane of the viewer.

In discrete display mode embodiments, the display system may use the identified focal plane of the viewer (e.g., depth thereof) to display the virtual objects corresponding to the 3D image data as shown in FIG. 15 and described in. U.S. Provisional Patent Application Ser. No. 62/945,024 filed on Dec. 6, 2019, the contents of which have been previously incorporated by reference herein.

FIG. 12B depicts a blended mode synthetic light field, according to some embodiments. In the blended display mode, the near and far cubes 810, 812 and the cylinder 814 are "virtually projected" onto respective virtual depth planes 1210, 1212, 1214 adjacent the respective location of the near and far cubes 810, 812 and the cylinder 814 along an optical axis ("Z axis") of the system. The near and far cubes 810, 812 and the cylinder 814 are only virtually projected because only the near and far depth planes 0, 1 are actually illuminated. As described above, virtual projection onto virtual depth planes 1210, 1212, 1214 are simulated through scaler blending of the sub-images projected onto the near and far depth planes 0, 1. The rendering of 2D images to be projected at each of the virtual depth planes 1210, 1212, 1214, including blending of objects therein, as described in U.S. Provisional Patent Application Ser. No. 62/851,773, the contents of which have been previously Incorporated by reference herein.

Although identification of the focal plane of the viewer (e.g., depth thereof) is not necessary to display objects in a blended display mode, identifying the focal plane of the viewer and allow the blended mode display system to operate within its hardware limitations (processing, display, memory, communications channels, etc.) In particular, and if I focal plane of the viewer allows a blended mode display system to efficiently apportion system resources for display of virtual objects in the focal plane of the viewer.

For blended display mode systems, the method can be streamlined in that instead of analyzing the 3D data to identify one or more virtual objects along the gaze path of the viewer 816, the display system can analyze only the 2D image frames of the blended mode display to identify one or more virtual objects along the gaze path of the viewer 816. This allows the display system to analyze less data, thereby increasing the system efficiency and reducing system resource demands.

The above embodiments include a variety of different methods for determining the depth of a user/viewer's point of focus. Determining a user/viewer's focal depth allows a display system to project objects in a discrete display mode at that focal depth, thereby reducing demands on the display system. Such reduced demands include display and processor speed, power, and heat generation. Determining a user/viewer's focal depth also allows a display system to project objects in a blended display mode while apportioning system resources to images on the user/viewer's focal plane. Further, the user/viewer focal plane determination steps described above are more efficient than other focal plane determination techniques and improves processor performance in terms of speed, power, and heat generation.

System Architecture Overview

FIG. 17 is a block diagram of an illustrative computing system 1700 suitable for implementing an embodiment of the present disclosure. Computer system 1700 includes a bus 1706 or other communication mechanism for communicating information, which interconnects subsystems and devices, such as processor 1707, system memory 1708 (e.g., RAM), static storage device 1709 (e.g., ROM), disk drive 1710 (e.g., magnetic or optical), communication interface 1714 (e.g., modem or Ethernet card), display 1711 (e.g., CRT or LCD), input device 1712 (e.g., keyboard), and cursor control.

According to one embodiment of the disclosure, computer system 1700 performs specific operations by processor 1707 executing one or more sequences of one or more instructions contained in system memory 1708. Such instructions may be read into system memory 1708 from another computer readable/usable medium, such as static storage device 1709 or disk drive 1710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1707 for execution. Such a medium may take many forms, including but not limited to, non-volatile media and volatile media. Non-volatile media includes, for example, optical or magnetic disks, such as disk drive 1710. Volatile media includes dynamic memory, such as system memory 1708.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In an embodiment of the disclosure, execution of the sequences of instructions to practice the disclosure is performed by a single computer system 1700. According to other embodiments of the disclosure, two or more computer systems 1700 coupled by communication link 1715 (e.g., LAN, PTSN, or wireless network) may perform the sequence of instructions required to practice the disclosure in coordination with one another.

Computer system 1700 may transmit and receive messages, data, and instructions, including program, i.e., application code, through communication link 1715 and communication interface 1714. Received program code may be executed by processor 1707 as it is received, and/or stored in disk drive 1710, or other non-volatile storage for later execution. Database 1732 in storage medium 1731 may be used to store data accessible by system 1700 via data interface 1733.

While the blended mode embodiments described above include two depth planes (e.g., near and far depth planes), other embodiments may include more than two depth planes. Increasing the number of depth planes increases the fidelity with which virtual depth planes are simulated. However, this increase in fidelity is offset by an increase in hardware and processing demands, which can exceed the resources available in current portable 3D rendering and display systems.

Certain aspects, advantages and features of the disclosure have been described herein. It is to be understood that not necessarily all such advantages may be achieved in accordance with any particular embodiment of the disclosure. Thus, the disclosure may be embodied or carried out in a manner that achieves or optimizes one advantage or group of advantages as taught herein without necessarily achieving other advantages as may be taught or suggested herein.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, methods, and the like described herein. A wide variety of variation is possible. Components, elements, and/or steps may be altered, added, removed, or rearranged.

The devices and methods described herein can advantageously be at least partially implemented using, for example, computer software, hardware, firmware, or any combination of software, hardware, and firmware. Software modules can include computer executable code, stored in a computer's memory, for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively, or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on non-transitory computer-readable media that, when read by a computer or other processing device, cause it to carry out the method.

While certain embodiments have been explicitly described, other embodiments will become apparent to those of ordinary skill in the art based on this disclosure.

The various processors and other electronic components described herein are suitable for use with any optical system for projecting light. The various processors and other electronic components described herein are also suitable for use with any audio system for receiving voice commands.

Various exemplary embodiments of the disclosure are described herein. Reference is made to these examples in a non-limiting sense. They are provided to illustrate more broadly applicable aspects of the disclosure. Various changes may be made to the disclosure described and equivalents may be substituted without departing from the true spirit and scope of the disclosure. In addition, many modifications may be made to adapt a particular situation, material, composition of matter, process, process act(s) or step(s) to the objective(s), spirit or scope of the present disclosure. Further, as will be appreciated by those with skill in the art, each of the individual variations described and illustrated herein has discrete components and features which may be readily separated from or combined with the features of any of the other several embodiments without departing from the scope or spirit of the present disclosure. All such modifications are intended to be within the scope of claims associated with this disclosure.

The disclosure includes methods that may be performed using the subject devices. The methods may include the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the variations described may be set forth and claimed independently, or in combination with any one or more of the features described herein. Reference to a singular item, includes the possibility that there is plural of the same items present. More specifically, as used herein and in claims associated hereto, the singular forms "a," "an," "said," and "the" include plural referents unless the specifically stated otherwise. In other words, use of the articles allows for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A system for determining a focal point depth of a user of a three-dimensional ("3D") display device, comprising:
    an eye tracking subsystem configured to track a first gaze path of the user, the first gaze path corresponding to a first eye of the user, and not corresponding to a second eye of the user; and
    a processor configured to:
        analyze, based on the first gaze path, 3D data to identify one or more virtual objects along the first gaze path of the user; and
        when it is determined, based on the identified one or more virtual objects and the first gaze path, that only one virtual object intersects the first gaze path of the user:
            analyze the 3D data to determine a depth of the only one virtual object; and
            determine that the focal point depth of the user is the determined depth of the only one virtual object using only the first gaze path of the user and the 3D data for the only one virtual object.

2. The system of claim 1, further comprising a display subsystem configured to display each of the one or more virtual objects at a respective depth from the user.

3. The system of claim 1, wherein the processor is configured to analyze the plurality of 3D data comprises analyzing depth segmentation data corresponding to 3D data.

4. The system of claim 1, wherein the eye tracking subsystem is configured to, when more than one virtual object intersects the first gaze path of the user, track a second gaze path of the user, the second gaze path corresponding to the second eye of the user, and not corresponding to the first eye of the user;
    wherein the processor is configured to, when more than one virtual object intersects the first gaze path of the user:
        analyze, based on the second gaze path, the 3D data to identify one or more virtual objects along the second gaze path of the user; and
        when it is determined, based on the identified one or more virtual objects and the first and second gaze paths, that only one virtual object intersects both the first gaze path and the second gaze path of the user:
            analyze the 3D data to determine a depth of the only one virtual object; and
            determine that the focal point depth of the user is the determined depth of the only one virtual object.

5. The system of claim 4, wherein determining a depth of the only one virtual object comprises analyzing the 3D data.

6. The system of claim 1, wherein determining a depth of the only one virtual object comprises analyzing the 3D data.

7. The system of claim 1, wherein the only one virtual object is located in a first side of a field of view of the user, the first side of the field of view being closer to the first eye of the user compared to the second eye of the user.

8. A system for determining a focal point depth of a user of a three-dimensional ("3D") display device, comprising:
   an eye tracking subsystem configured to track a first gaze path of the user, the first gaze path corresponding to a first eye of the user, and not corresponding to a second eye of the user; and
   a processor configured to:
      analyze, based on the first gaze path, a plurality of two-dimensional ("2D") image frames displayed by the display device to identify one or more virtual objects along the first gaze path of the user; and
      when it is determined, based on the identified one or more virtual objects and the first gaze path, that only one 2D image frame of the plurality includes a virtual object along the first gaze path of the user:
         analyze the plurality of 2D image frames to determine a depth of the only one 2D image frame; and
         determine that the focal point depth of the user is the determined depth of the only one 2D image frame using only the first gaze path of the user and 3D data for the virtual object.

9. The system of claim 8, further comprising a display subsystem configured to display each of the plurality of 2D image frames at respective depths from the user.

10. The system of claim 8, wherein analyzing the plurality of 2D image frames comprises analyzing depth segmentation data corresponding to the plurality of 2D image frames.

11. The system of claim 8, wherein the eye tracking subsystem is configured to, when more than one 2D image frame of the plurality includes a virtual object along the first gaze path of the user, track a second gaze path of the user, the second gaze path corresponding to the second eye of the user, and not corresponding to the first eye of the user;
   wherein the processor is configured to, when more than one virtual object intersects the first gaze path of the user:
      analyze, based on the second gaze path, the plurality of 2D image frames displayed by the display device to identify one or more virtual objects along the second gaze path of the user; and
      when it is determined, based on the identified one or more virtual objects and the first and second gaze paths, that only one 2D image frame of the plurality includes a virtual object along both the first gaze path and the second gaze path of the user:
         analyze the 3D data to determine a depth of the only one 2D image frame; and
         determine that the focal point depth of the user to the determined depth of the only one 2D image frame.

12. The system of claim 11, wherein determining a depth of the only one 2D image frame comprises analyzing the 2D image frame.

13. The system of claim 8, wherein determining a depth of the only one 2D image frame comprises analyzing the 2D image frame.

\* \* \* \* \*